United States Patent
Suh et al.

(10) Patent No.: US 11,650,722 B2
(45) Date of Patent: May 16, 2023

(54) ELECTRONIC DEVICE AND METHOD FOR MANAGING WINDOW

(71) Applicant: Samsung Electronics Co., Ltd., Suwon-si (KR)

(72) Inventors: Jae Woo Suh, Seoul (KR); Young Kyu Seon, Yongin-si (KR); Seong Hoon Choi, Yongin-si (KR); Jong Seung Baek, Hwaseong-si (KR); Jeong Won Yang, Suwon-si (KR); Kwang Ho Lim, Suwon-si (KR); So Jung Jang, Bucheon-si (KR); Gye Hun Jeon, Suwon-si (KR); Byung Seok Jung, Suwon-si (KR); Jun Hee Cho, Suwon-si (KR); Jae Sook Joo, Seongnam-si (KR); Seung Heo, Seoul (KR); Ga Jin Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/379,838

(22) Filed: Jul. 19, 2021

(65) Prior Publication Data
US 2021/0349610 A1 Nov. 11, 2021

Related U.S. Application Data

(63) Continuation of application No. 15/908,674, filed on Feb. 28, 2018, now Pat. No. 11,086,494.

(30) Foreign Application Priority Data

Feb. 28, 2017 (KR) .................... 10-2017-0026706

(51) Int. Cl.
G09G 5/14 (2006.01)
G06F 3/04842 (2022.01)
(Continued)

(52) U.S. Cl.
CPC ........ *G06F 3/04842* (2013.01); *G06F 3/0412* (2013.01); *G06F 3/0481* (2013.01);
(Continued)

(58) Field of Classification Search
CPC .. G06F 3/04842; G06F 3/0412; G06F 3/0481; G06F 3/0488; G06F 3/1423; G06F 3/1454; G09G 5/14; G09G 5/391
See application file for complete search history.

(56) References Cited

U.S. PATENT DOCUMENTS 8,711,091 B2   4/2014 Nomura et al.
9,342,325 B2   5/2016 Barat et al.
(Continued)

FOREIGN PATENT DOCUMENTS

KR  10-2014-0034100 A   3/2014
KR  10-2014-0128579 A   11/2014

OTHER PUBLICATIONS

Korean Intellectual Property Office, "Notice of Allowance for Patent" dated Aug. 20, 2021, in connection with Korean Patent Application No. 10-2017-0026706, 10 pages.
(Continued)

*Primary Examiner* — Beau D Spratt

(57) ABSTRACT

An electronic device includes a touch screen display, an input/output interface, a communication circuit, a memory, and a processor, and the processor modifies screen configuration information associated with at least a part of a resolution, a density, and an orientation of a screen output by the electronic device if the electronic device is connected to the external display device through the input/output interface, determines whether a target application to be displayed on the external display device supports resizing of a window that displays an execution screen of the target application, configures a first type of window which is resizable if the
(Continued)

target application supports the resizing, configures a second type of window with a fixed size if the target application does not support the resizing, and displays the first type of window or the second type of window on the external display device.

16 Claims, 18 Drawing Sheets

(51) Int. Cl.
  *G09G 5/391* (2006.01)
  *G06F 3/0488* (2022.01)
  *G06F 3/041* (2006.01)
  *G06F 3/0481* (2022.01)
  *G06F 3/14* (2006.01)

(52) U.S. Cl.
  CPC .......... *G06F 3/0488* (2013.01); *G06F 3/1423* (2013.01); *G06F 3/1454* (2013.01); *G09G 5/14* (2013.01); *G09G 5/391* (2013.01)

(56) References Cited

U.S. PATENT DOCUMENTS

| | | |
|---|---|---|
| 9,684,428 B2 | 6/2017 | Wu |
| 9,699,291 B2 | 7/2017 | Zhao et al. |
| 10,444,503 B2 | 10/2019 | Joo et al. |
| 2011/0113363 A1* | 5/2011 | Hunt .................... G06F 3/0484 715/800 |
| 2011/0246904 A1 | 10/2011 | Pinto et al. |
| 2011/0300947 A1 | 12/2011 | Guo et al. |
| 2013/0024778 A1 | 1/2013 | Reeves et al. |
| 2013/0055113 A1 | 2/2013 | Chazin et al. |
| 2013/0278484 A1 | 10/2013 | Hwang et al. |
| 2014/0016037 A1* | 1/2014 | Goldberg ............... H04N 5/265 348/600 |
| 2014/0075377 A1* | 3/2014 | Kang .................. G06F 3/04842 715/788 |
| 2014/0215388 A1 | 7/2014 | Park-Ekecs et al. |
| 2015/0040062 A1 | 2/2015 | Hollis et al. |
| 2015/0186016 A1 | 7/2015 | Li |
| 2015/0365306 A1 | 12/2015 | Chaudhri et al. |
| 2016/0077682 A1 | 3/2016 | Reeves et al. |
| 2016/0147499 A1* | 5/2016 | Ryu ....................... G06F 3/1454 715/748 |
| 2016/0202852 A1 | 7/2016 | Park et al. |
| 2016/0364086 A1 | 12/2016 | Poore et al. |
| 2017/0024100 A1* | 1/2017 | Pieper .................... G06F 40/40 |

OTHER PUBLICATIONS

European Patent Office, "European Search Report," Application No. EP 18159276.7, dated Jul. 2, 2018, 9 pages.
Notice of Preliminary Rejection dated May 25, 2021 in connection with Korean Patent Application No. 10-2017-0026706, 18 pages.

\* cited by examiner

ELECTRONIC DEVICE AND METHOD FOR MANAGING WINDOW

CROSS-REFERENCE TO RELATED APPLICATIONS

This application is a continuation of U.S. patent application Ser. No. 15/908,674 filed on Feb. 28, 2018, which is based on and claims priority under 35 U.S.C. § 119 to Korean Patent Application No. 10-2017-0026706 filed on Feb. 28, 2017, in the Korean Intellectual Property Office, the disclosures of which are herein incorporated by reference in their entirety.

TECHNICAL FIELD

Embodiments of the present disclosure relate to a technology for configuring a window that displays an execution screen of an application.

BACKGROUND

Various forms of electronic products have been developed and widely used with the development of electronic technologies. Especially, in recent years, mobile electronic devices, such as smartphones, tablet PCs, wearable devices, and the like, which have a variety of functions have been widely used. Due to the convenience of mobile electronic devices, the number of times that the mobile electronic devices are used is gradually increasing. Recently, traffic shares of mobile electronic devices have been increased to be greater than traffic shares of conventional PCs, such as desktop computers, laptop computers, or the like.

The above information is presented as background information only to assist with an understanding of the present disclosure. No determination has been made, and no assertion is made, as to whether any of the above might be applicable as prior art with regard to the present disclosure.

SUMMARY

Since certain mobile electronic devices have the disadvantage of a small display area, a technology for displaying a screen of the mobile electronic device on an external display device connected to the mobile electronic device has been developed. In this case, the mobile electronic device may modify the size, resolution, and/or density of the screen and may reconfigure a user interface (UI) since usability is decreased when the screen of the mobile electronic device is displayed on the external display device as it is. The mobile electronic device may display the reconfigured screen on the external display device. The mobile electronic device may execute an application and may display an execution screen of the application in a window that occupies a partial area of the screen. The mobile electronic device may also adjust the size of the window. However, some of the applications installed in the mobile electronic device may not support reconfiguration of the UI and resizing of the window. In the case where the mobile electronic device configures the screen to display the above-described application on the external display device, the screen may not be properly output.

Aspects of the present disclosure are to address at least the above-mentioned problems and/or disadvantages and to provide at least the advantages described below. Accordingly, certain embodiments according to the present disclosure provide an electronic device and a method for outputting execution screens of various applications using an external display device.

In some embodiments according to the present disclosure, an electronic device includes a touch screen display, an input/output interface connected to an external display device, a communication circuit in communication with a server, a memory, and a processor electrically connected to the touch screen display, the input/output interface, the communication circuit, and the memory. The processor modifies screen configuration information associated with at least a part of a resolution, a density, and an orientation of a screen output by the electronic device when the electronic device is connected to the external display device through the input/output interface, determines whether a target application to be displayed on the external display device supports resizing of a window that displays an execution screen of the target application, configures a first type of window which is resizable, based on the modified screen configuration information and the execution screen of the target application when the target application supports the resizing, configures a second type of window with a fixed size, based on the modified screen configuration information and the execution screen of the target application when the target application does not support the resizing, and displays the first type of window or the second type of window on the external display device.

In certain embodiments according to the present disclosure, a method includes modifying screen configuration information associated with at least a part of a resolution, a density, and an orientation of a screen displayed on the electronic device when the electronic device is connected to an external display device, determining whether a target application to be displayed on the external display device supports resizing of a window that displays an execution screen of the target application, configuring a first type of window which is resizable, based on the modified screen configuration information and the execution screen of the target application when the target application supports the resizing, configuring a second type of window with a fixed size, based on the modified screen configuration information and the execution screen of the target application when the target application does not support the resizing, and displaying the first type of window or the second type of window on the external display device.

In various embodiments according to the present disclosure, an electronic device includes a housing including a first surface and a second surface facing away from the first surface, a touch screen display exposed through a portion of the first surface, at least one communication circuit positioned inside the housing, at least one processor positioned inside the housing and electrically connected to the touch screen display and the at least one communication circuit, and a memory positioned inside the housing and electrically connected to the at least one processor. The memory stores a first application program including a first type of user interface that provides at least one piece of information about whether a window can be resized, which orientation the window can have, and/or a resolution on the touch screen display, and a second application program including a second type of user interface that provides at least one piece of information about whether the window can be resized, which orientation the window can have, and/or the resolution on the touch screen display. The memory stores instructions that, when executed, cause the at least one processor to detect that the electronic device is in communication with an external display device via the at least one communication circuit, to provide data to the external display device via the at least one communication circuit for rendering a user interface on the external display device, upon detecting that the electronic device is in communication with the external display device, to cause the external display device to display a first window that is variable in size, orientation, and/or resolution if the data is associated with the first application program, and to cause the external display device to display a second window with a selected fixed size, orientation, and/or resolution if the data is associated with the second application program.

According to certain embodiments of the present disclosure, by configuring, based on characteristics of applications, windows for displaying execution screens of the applications, it is possible to output execution screens of various applications in suitable windows through an external display device connected to an electronic device.

In addition, embodiments according to the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
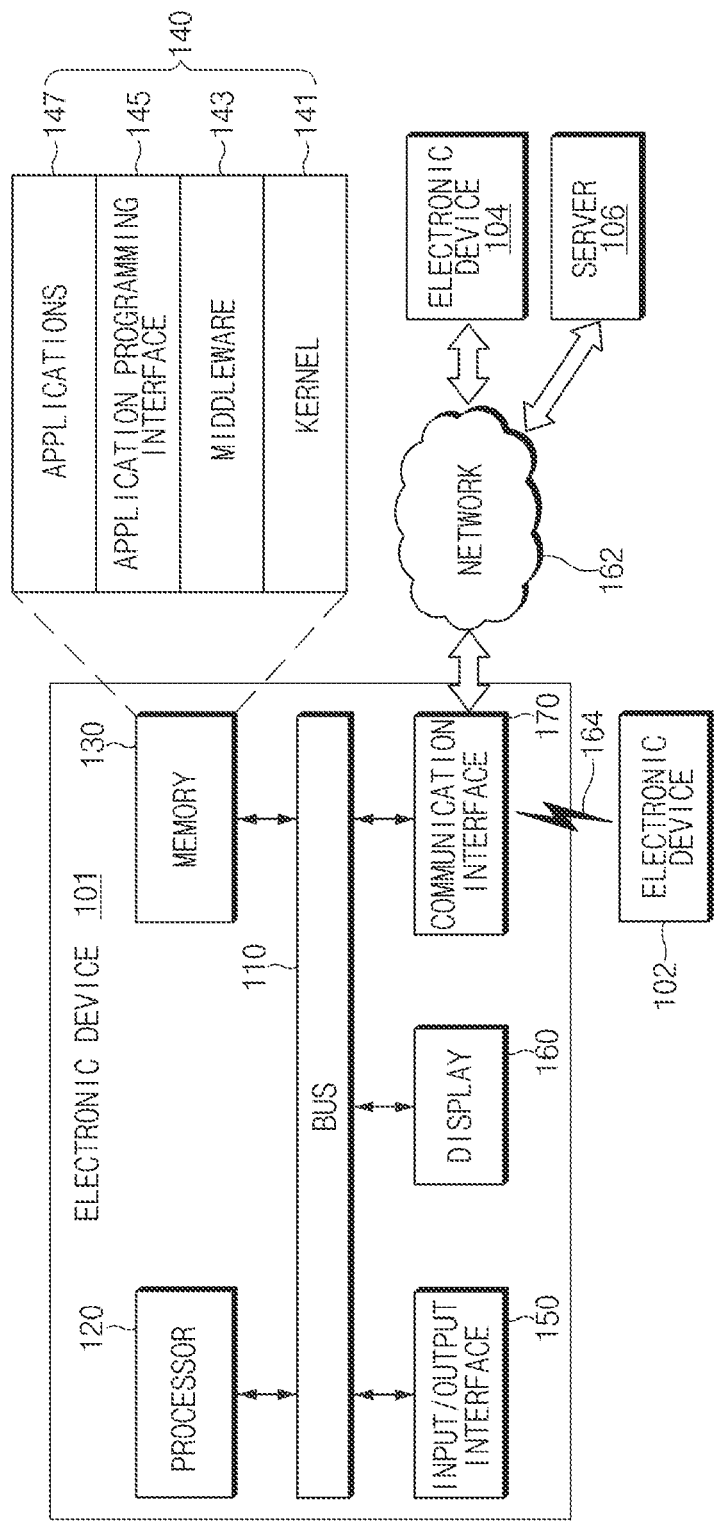
FIG. 1 illustrates an electronic device in a network environment according to various embodiments.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to the non-limiting example of FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store commands or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play the role, for example, of an interface which transmits a command or data input from a user or another external device, to other element(s) of the electronic device 101. Furthermore, the input/output interface 150 may output a command or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), light fidelity (Li-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
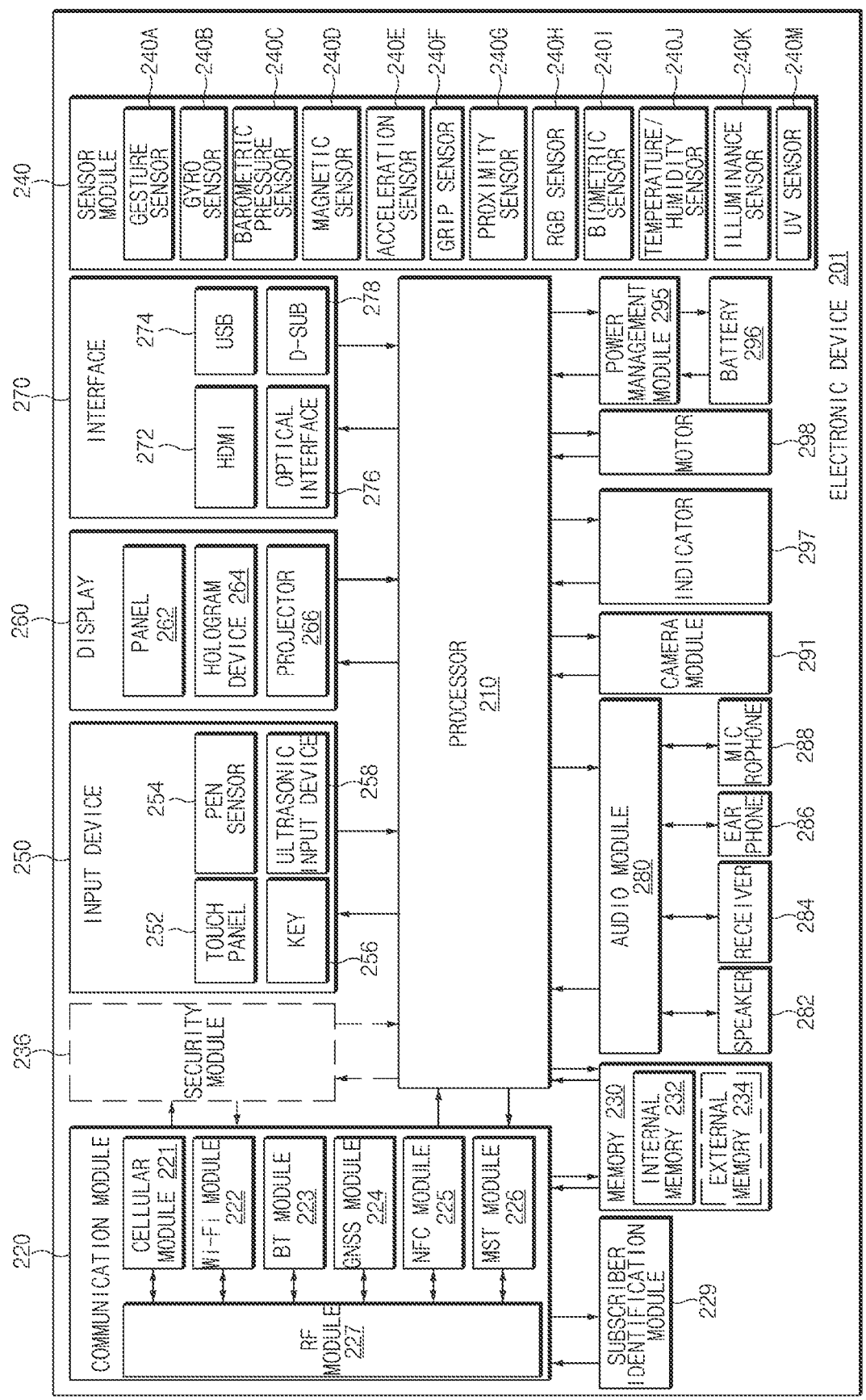
FIG. 2 illustrates, in block diagram format, an electronic device according to various embodiments of this disclosure.

FIG. 2 illustrates in block diagram format an electronic device, according to various embodiments.

Referring to the non-limiting example of FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load a command or data, which is received from at least one of other elements (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
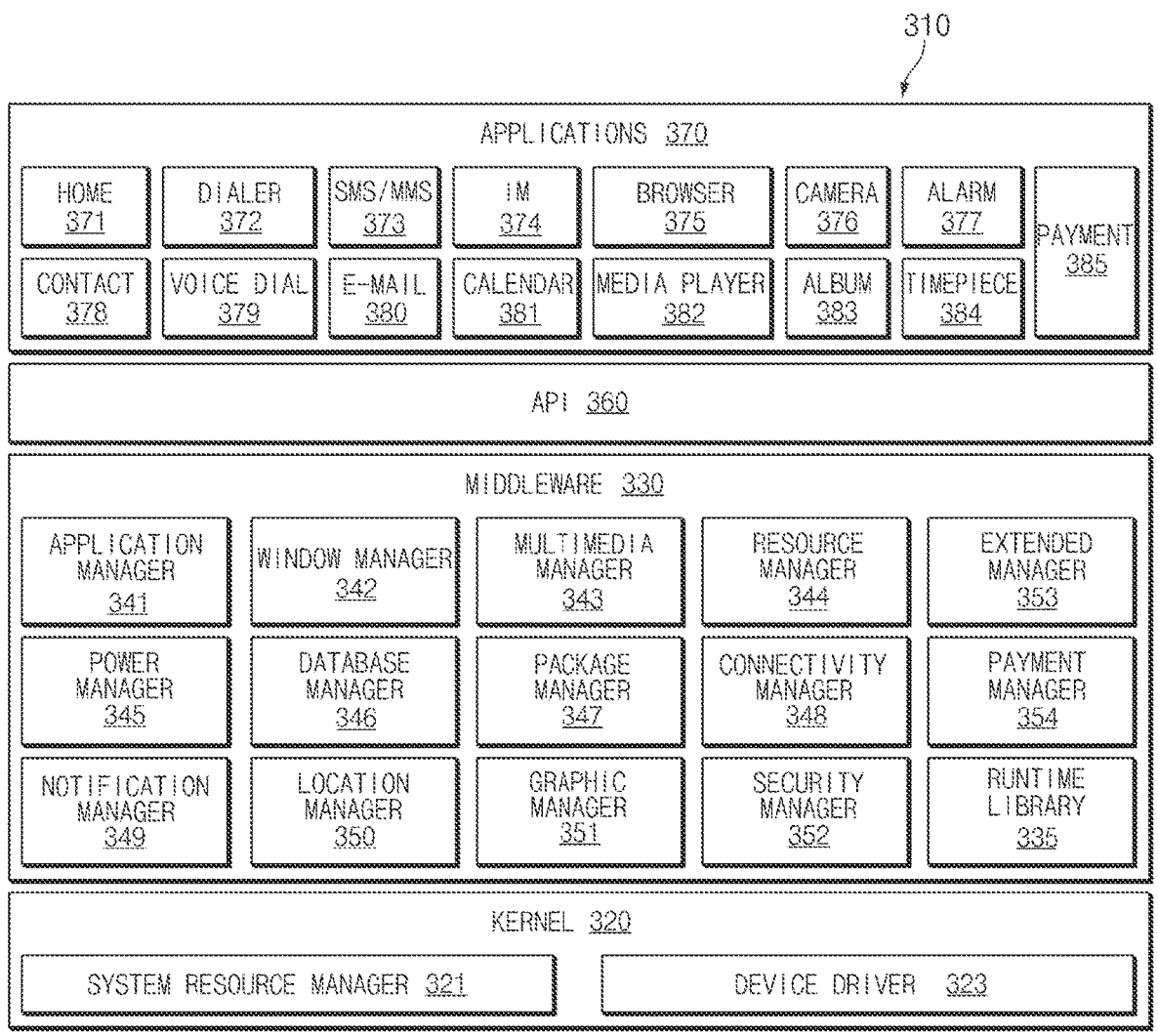
FIG. 3 illustrates, in block diagram format, a program module according to various embodiments.

FIG. 3 illustrates in block diagram format, a program module, according to various embodiments of this disclosure.

According to certain embodiments, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, or Tizen™.

The program module 310 may include a kernel 320, a middleware 330, an application programming interface (API) 360, and/or an application 370. At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, an extended screen manager, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage capacity of a battery, temperature, or power, and may determine and provide power information for an operation of an electronic device by using corresponding information from among the capacity of a battery, temperature, or power. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, the extended screen manager 453 may manage information to be provided, a graphic effect, or a user interface associated with the information to be provided or the graphic effect, through the area of a display determined such that a graphic image is displayed.

According to an embodiment, in the case where an electronic device (e.g., the electronic device 101) includes a telephony function, the middleware 330 may further include a telephony manager for managing a voice or video call function of the electronic device. The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, a payment 385 or for offering health care (e.g., measuring an exercise quantity, blood sugar, or the like) or environment information (e.g., information of barometric pressure, humidity, temperature, or the like).

According to some embodiments, the application 370 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to various embodiments, the application 370 may include an application (e.g., a health care application of a mobile medical device) that is assigned in accordance with an attribute of an external electronic device. According to an embodiment, the application 370 may include an application that is received from an external electronic device (e.g., the first electronic device 102, the second electronic device 104, or the server 106). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
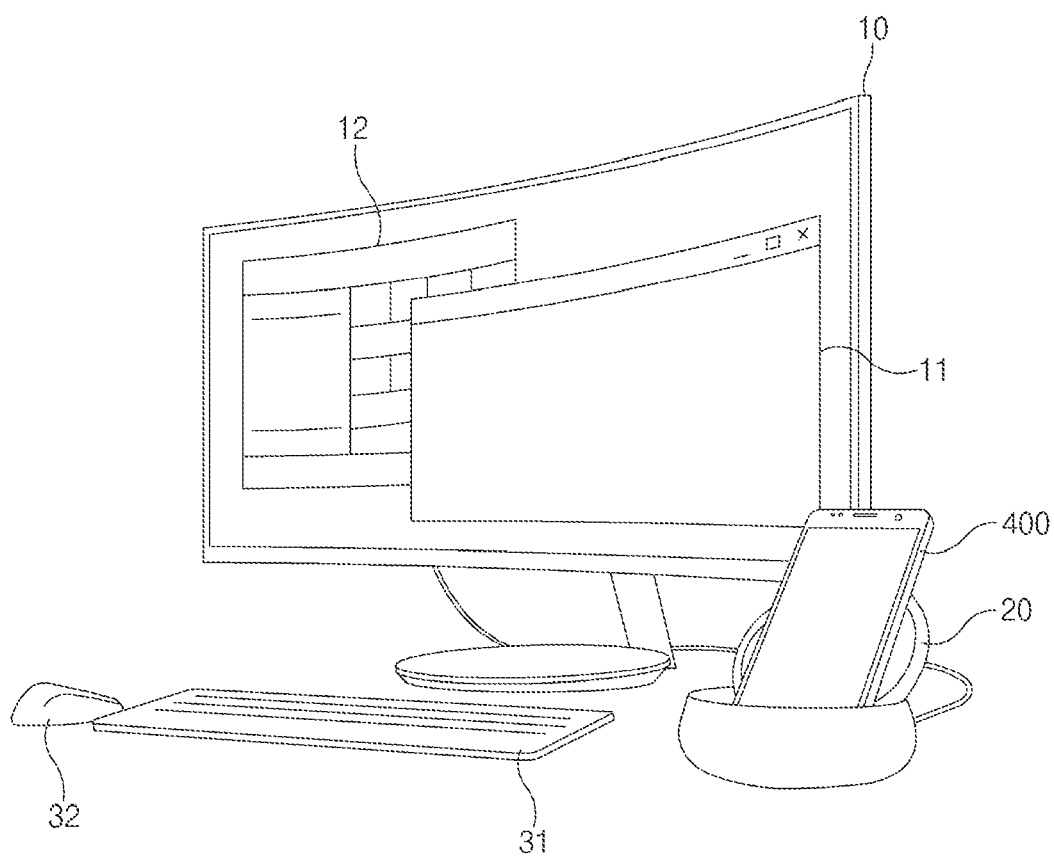
FIG. 4 illustrates an operating environment of an electronic device according to certain embodiments.

FIG. 4 illustrates an operating environment of an electronic device according to some embodiments.

Referring to the non-limiting example of FIG. 4, an electronic device 400 according to some embodiments may be connected to an intermediary device 20 and an external display device 10. The electronic device 400 may be, for example, a mobile device, such as a smartphone, a tablet PC, a wearable device, or the like. The size of the electronic device 400 may be limited for portability, and therefore a touch screen display included in the electronic device 400 may also have a limitation in size.

The electronic device 400 may be connected to the external display device 10 through the intermediary device 20. The intermediary device 20 may be, for example, a dock (or a docking station). The electronic device 400 may be placed on the intermediary device 20. The electronic device 400 may be connected to the intermediary device 20 through, for example, an input/output interface, such as a USB port. The intermediary device 20 may connect the electronic device 400 and the external display device 10. Although FIG. 4 illustrates that the electronic device 400 is connected to the external display device 10 through the intermediary device 20, the electronic device 400, without being limited thereto, may be connected to the external display device 10 through a cable or in a wireless manner.

When the electronic device 400 is connected to the external display device 10, the electronic device 400 may output a screen through the external display device 10. The electronic device 400 may reconfigure a screen displayed on the touch screen display thereof and may output the reconfigured screen through the external display device 10. In this case, the electronic device 400 may provide a UI or UX similar to using a desktop to a user through the external display device 10. The electronic device 400 may configure a window (e.g., a first window 11 and a second window 12) occupying a partial area or the entire area of the screen output through the external display device 10 to display an execution screen of an application. The electronic device 400 may determine whether the corresponding application supports resizing of the window. For example, the electronic device 400 may determine whether the corresponding application supports a window of the Windows operating system or a freeform window of the Android operating system. Depending on whether the corresponding application supports resizing of the window, the electronic device 400 may configure a window having appropriate characteristics for the corresponding application.

In some embodiments, electronic device 400 may be wiredly or wirelessly connected to an external input device, such as a keyboard 31, a mouse 32, or the like. The electronic device 400 may receive a user input through the keyboard 31 or the mouse 32. A user may control the electronic device 400 by using the keyboard 31 or the mouse 32. The electronic device 400 may also receive a user input through the touch screen display thereof.

Figure 5:
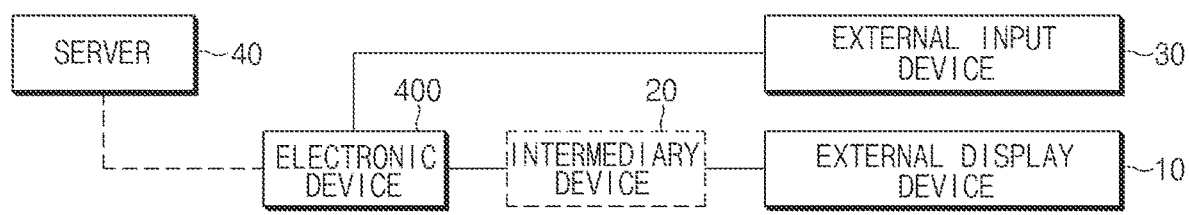
FIG. 5 illustrates a connection relationship between an electronic device and external devices, according to certain embodiments of this disclosure.

FIG. 5 illustrates, in block diagram format, a connection relationship between an electronic device and external devices, according to some embodiments of this disclosure.

Referring to the non-limiting example of FIG. 5, the electronic device 400 according to certain embodiments may be in communication with the external display device 10, the intermediary device 20, an external input device 30, and the server 40. The electronic device 400 may be a mobile device, such as a smartphone, a tablet PC, a wearable device, or the like, which is capable of providing a UI and/or UX similar to a desktop to a user by using the external display device 10. The electronic device 400 may be connected to the external display device 10 through the intermediary device 20, such as a dock. The electronic device 400 may be connected to the external display device 10 through a cable (e.g., an HDMI cable) or in a wireless manner.

The external display device 10, when connected to the electronic device 400, may display a screen processed by the electronic device 400. The external display device 10 may be one of various devices, such as a monitor, TV, and the like, which include a display.

The external input device 30 may transmit a user input to the electronic device 400. The external input device 30 may be one of various devices, such as a keyboard, a mouse, and the like, which are capable of receiving a user input. The external input device 30 may be connected to the electronic device 400 directly or through the intermediary device 20. The external input device 30 may be wirelessly or wiredly connected to the intermediary device 20 or the electronic device 400. In the case where the electronic device 400 is connected to the external display device 10, the electronic device 400 may provide a UI or UX similar to a desktop in response to an input to the external input device 30. For example, in the case where the electronic device 400 is connected to the external display device 10, the electronic device 400 may provide a context menu in response to an input to a right button of a mouse.

The server 40 may be in wireless communication with the electronic device 400. The server 40 may store a list (a white list) of applications that support resizing of a window. The server 40 may also store a list (a black list) of applications that cannot be executed when the electronic device 400 is connected to the external display device 10. The lists stored in the server 40 may be consistently updated. The server 40 may transmit the lists to the electronic device 400. According to an embodiment, the server 40 may transmit, to the electronic device 400, a list of applications installed in the electronic device 400, among the lists stored in the server 40.

Figure 6:
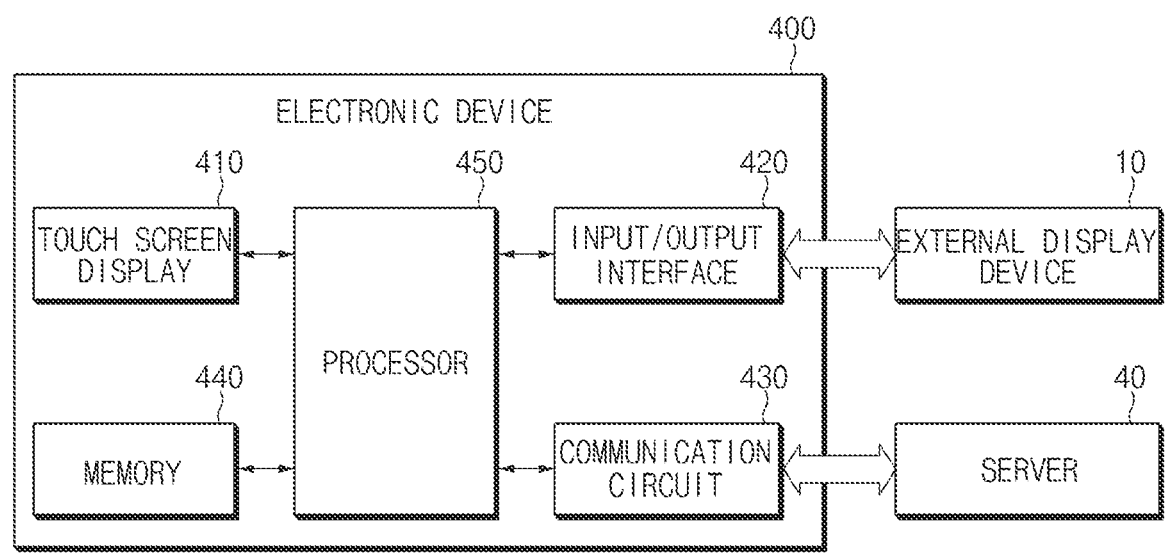
FIG. 6 illustrates a configuration of an electronic device according to some embodiments.

FIG. 6 illustrates, in block diagram format, a configuration of an electronic device according to various embodiments of this disclosure.

Referring to the non-limiting example of FIG. 6, the electronic device 400 according to an embodiment may include a touch screen display 410, an input/output interface 420, a communication circuit 430, a memory 440, and a processor 450.

The touch screen display 410 may detect a touch input and may output a screen. For example, the touch screen display 410 may include a touch panel for detecting a touch input and a display panel for outputting an image. The touch screen display 410 may not output a screen in the case where the electronic device 400 is connected to the external display device 10. The touch screen display 410 may detect a touch input even in the case where the electronic device 400 is connected to the external display device 10.

The input/output interface 420 may be connected to the external display device 10. The input/output interface 420 may be wirelessly or wiredly connected to the external display device 10. The input/output interface 420 may be connected to the external display device 10 through an intermediary device, such as a dock, or through a cable. The input/output interface 420 may be one of various interfaces, such as a USB, an HDMI, a D-SUB, an optical interface, and the like. The input/output interface 420 may be a communication interface that is in wireless communication with the external display device 10.

The communication circuit 430 may be in communication with the server 40. The communication circuit 430 may receive information from the server 40. For example, the communication circuit 430 may receive, from the server 40, a list (a white list) of applications that support resizing of a window and/or a list (a black list) of applications that cannot be executed when the electronic device 400 is connected to the external display device 10. The communication circuit 430 may be in communication with the server 40 by a communication method, such as LTE, Wi-Fi, or the like.

The memory 440 may include a volatile memory and/or a non-volatile memory. For example, the memory 440 may store one or more applications. In another example, the memory 440 may store a first launcher for the touch screen display 410 and a second launcher for the external display device 10. The memory 440 may store an operating system of the electronic device 400 and may also store a framework included in the operating system. Program modules stored in the memory 440 will be described below in detail with reference to FIG. 7.

The processor 450 may be electrically connected to the touch screen display 410, the input/output interface 420, the communication circuit 430, and the memory 440. The processor 450 may control the touch screen display 410, the input/output interface 420, the communication circuit 430, and the memory 440.

According to certain embodiments, the processor 450 may execute the first launcher for the touch screen display 410 while the electronic device 400 is disconnected from the external display device 10. The first launcher may provide a UI and UX appropriate for the touch screen display 410. The processor 450 may display an execution screen of the first launcher on the touch screen display 410.

According to various embodiments, the electronic device 400 may be connected to the external display device 10 through the input/output interface 420. The electronic device 400 may be connected to the external display device 10 through a cable connected to the input/output interface 420 or through an intermediary device (e.g., a dock). The processor 450 may recognize the connection between the electronic device 400 and the external display device 10. Even in the case where the electronic device 400 is connected to the intermediary device, which is connected to the external display device 10, through the input/output interface 420, the processor 450 may recognize that the electronic device 400 is connected to the external display device 10.

According to at least one embodiment, the processor 450 may modify screen configuration information when the electronic device 400 is connected to the external display device 10 through the input/output interface 420. The screen configuration information may be associated with at least some of the resolution, density, and orientation (portrait or landscape) of a screen output by the electronic device 400. The electronic device 400 may store screen configuration information that includes resolution information and density information that correspond to the touch screen display 410 and orientation information about an orientation in which a screen is displayed on the touch screen display 410. The processor 450 may modify the screen configuration information to output the screen through the external display device 10 when the electronic device 400 is connected to the external display device 10. The processor 450 may modify the screen configuration information to a specified value when the electronic device 400 is connected to the external display device 10 through the input/output interface 420. For example, the processor 450 may modify the resolution information to 1920×1080 (FHD), the density information to 160 dpi (MDPI), and the orientation information to landscape when the electronic device 400 is connected to the external display device 10. In another example, the processor 450 may modify the screen configuration information, based on information about the external display device 10 when the electronic device 400 is connected to the external display device 10 through the input/output interface 420. The processor 450 may modify the resolution information, the density information, and the orientation information, based on specifications of the external display device 10.

According to some embodiments, the processor 450 may execute the second launcher for the external display device 10 when the electronic device 400 is connected to the external display device 10 through the input/output interface 420. The second launcher may provide a UI and UX appropriate for the external display device 10. An execution screen of the second launcher will be described below in detail with reference to FIGS. 9 to 11.

According to some embodiments, the processor 450 may determine whether a target application to be displayed on the external display device 10 supports resizing of a window that displays an execution screen of the target application. The processor 450 may determine whether an application being executed in the electronic device 400 when the electronic device 400 is connected to the external display device 10 or an application executed after the electronic device 400 is connected to the external display device 10 supports resizing. For example, the processor 450 may determine whether the target application supports resizing, based on information included in a manifest of the target application. The manifest of the target application may include a declaration representing whether to support resizing. The processor 450 may determine whether the target application supports resizing, based on the declaration included in the manifest. In another example, the processor 450 may determine whether the target application supports resizing, based on whether the target application is a preload application or not. The processor 450 may determine the preload application to be an application that supports resizing. In another example, the processor 450 may determine whether the target application supports resizing, based on a list received from the server 40. If the target application is included in a white list, the processor 450 may determine that the target application supports resizing.

According to certain embodiments, if the target application supports resizing, the processor 450 may configure a first type of window which is resizable, based on the modified screen configuration information and the execution screen of the target application. For example, the processor 450 may configure the first type of window, which includes the execution screen of the target application, in at least a partial area of a landscape screen with 1920×1080 (FHD) and 160 dpi (MDPI). The processor 450 may reconfigure the execution screen of the target application, based on information stored in advance in the target application. For example, the processor 450 may modify the size and/or position of text, an image, a UI, and/or UX included in the execution screen of the target application. The target application that supports resizing may include information about a configuration of the screen according to the size of the window. The processor 450 may generate, in at least a partial area of the screen, the first type of window including the reconfigured execution screen.

According to at least one embodiment, the processor 450 may display the first type of window on the external display device 10 after the first type of window is configured. The processor 450 may display the first type of window, which includes the execution screen of the target application, in at least a partial area of the external display device 10. The processor 450 may provide the screen including the first type of window to the external display device 10. The processor 450 may resize the first type of window after the first type of window is displayed on the external display device 10. After the first type of window is resized, the processor 450 may reconfigure the execution screen of the target application, which is included in the first type of window, based on information stored in advance in the target application to fit the size of the first type of window.

According to certain embodiments, if the target application does not support resizing, the processor 450 may configure a second type of window with a fixed size, based on the modified screen configuration information and the execution screen of the target application. For example, the processor 450 may configure the second type of window, which includes the execution screen of the target application, in a partial area of a landscape screen with 1920×1080 (FHD) and 160 dpi (MDPI). For example, the processor 450 may configure the second type of window with the same size as that of the touch screen display 410. In another example, the processor 450 may configure the second type of window with the same aspect ratio as that of the touch screen display 410. The processor 450 may generate, in a partial area of the screen, the second type of window that includes the execution screen of the target application and has the same configuration as that of the execution screen of the target application when the execution screen of the target application is displayed on the touch screen display 410.

According to various embodiments, the processor 450 may display the second type of window on the external display device 10 after the second type of window is configured. The processor 450 may display the second type of window, which includes the execution screen of the target application, in a partial area of the external display device 10. The processor 450 may provide the screen including the second type of window to the external display device 10. Resizing of the second type of window may not be allowed after the second type of window is output.

According to some embodiments, when an input is applied to a point in the second type of window, the processor 450 may recognize coordinates where the input is applied, may transform the recognized coordinates, based on the modified screen configuration information and the position of the second type of window, and may execute an operation of the target application that corresponds to the input to the transformed coordinates. The transformation of the coordinates will be described below in detail with reference to FIG. 16.

Figure 7:
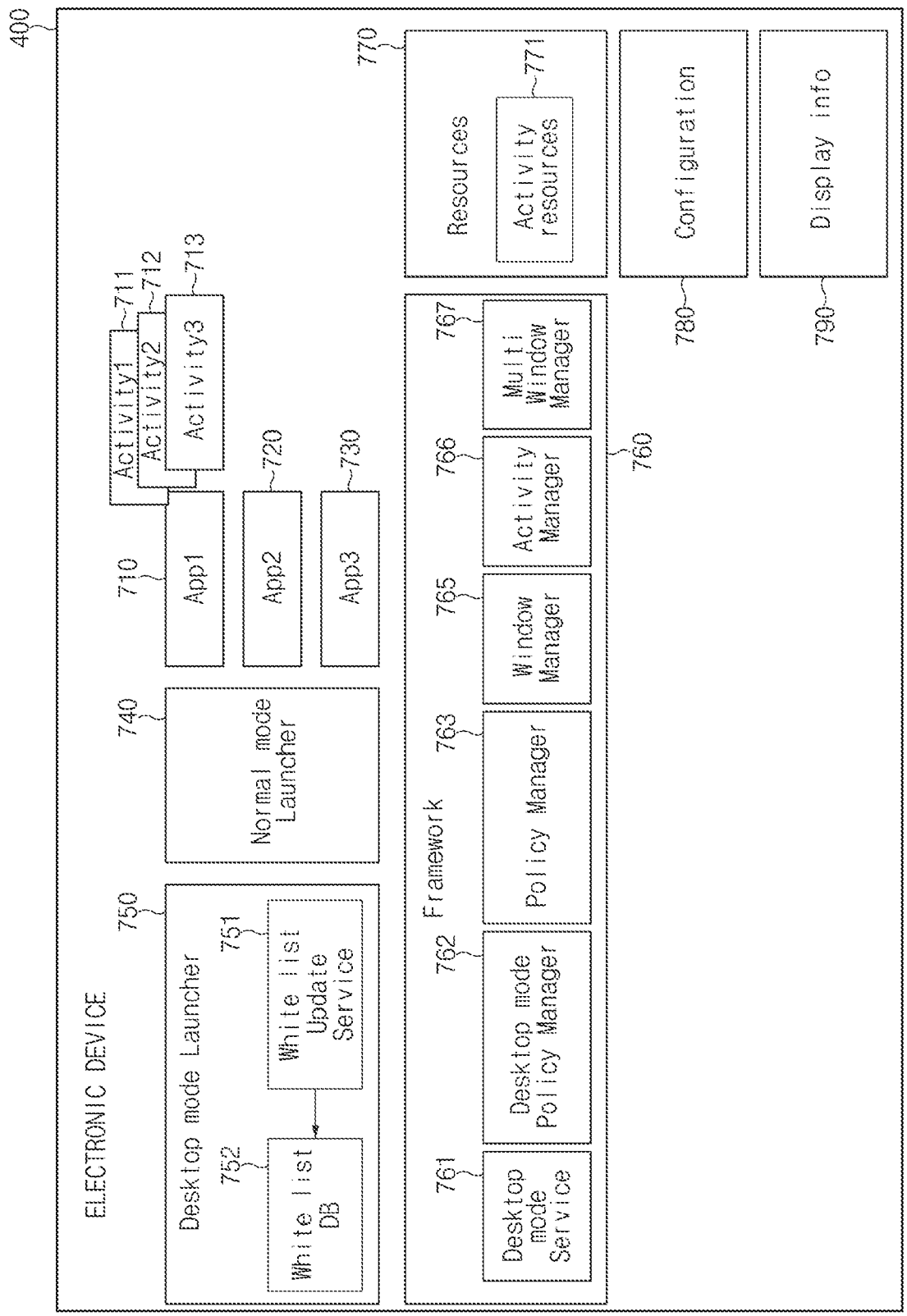
FIG. 7 illustrates, in block diagram format program modules included in an electronic device according to some embodiments.

FIG. 7 illustrates, in block diagram format, program modules included in an electronic device according to various embodiments of this disclosure.

Referring to the non-limiting example of FIG. 7, the electronic device 400 according to certain embodiments may store a first application 710, a second application 720, a third application 730, a normal mode launcher 740, a desktop mode launcher 750, a framework 760, resources 770, a configuration 780, and display info 790. The program modules illustrated in FIG. 7 may be stored in the memory 440 of FIG. 6 and may be executed by the processor 450 of FIG. 6.

According to the non-limiting example of FIG. 7, electronic device 400 may store the plurality of applications 710, 720, and 730. In FIG. 7, the electronic device 400 is illustrated as storing the three applications 710, 720, and 730. Without being limited thereto, however, the electronic device 400 may store any number of applications. Each of the applications 710, 720, and 730 may include a plurality of activities. For example, the first application 710 may include a first activity 711, a second activity 712, and a third activity 713. In FIG. 7, the first application 710 is illustrated as including the three activities 711, 712, and 713. Without being limited thereto, however, the first application 710 may include any number of activities. The activities may require only a landscape screen, only a portrait screen, or both a landscape screen and a portrait screen.

The normal mode launcher 740 may be executed in the case where the electronic device 400 is disconnected from an external display device. The normal mode launcher 740 may provide a UI and UX, such as a home screen displayed on the touch screen display 410.

The desktop mode launcher 750 may be executed in the case where the electronic device 400 is connected to an external display device. When the electronic device 400 is connected to the external display device, the desktop mode launcher 750 may provide an introduction to a desktop mode and may provide an execution or mirroring connection option of the desktop mode. The desktop mode launcher 750 may provide a UI or UX similar to a desktop displayed on the external display device. The desktop mode launcher 750 may support resizing of a resizable window.

The desktop mode launcher 750 may include a white list update service 751 and a white list database 752. The white list update service 751 may obtain, from a server, a white list that is a list of applications that support resizing. For example, the white list update service 751 may inquire the server as to whether the white list is updated, every specified period by using an alarm service after the desktop mode launcher 750 is executed. The white list update service 751 may obtain a URI of a white list file and may download the white list file by using an API provided by a contents cloud server. In another example, if the white list is updated, the server may convey the white list to a policy manager 763 in the framework 760. The policy manager 763 may store the white list in a policy database. The white list update service 751 may receive the white list from the policy manager 763 and may store the white list in the white list database 752. The white list database 752 may store the name of an application and/or a package that supports resizing. The white list database 752 may also store the name of an application that supports resizing, among the applications installed in the electronic device 400, and/or the name of a package that supports resizing.

The framework 760 may include a desktop mode service 761, a desktop mode policy manager 762, the policy manager 763, a window manager 765, an activity manager 766, and multi-window manager 767.

The desktop mode service 761 may obtain information associated with resizing of an application when the application is executed. For example, the desktop mode service 761 may obtain information about a declaration of resizing that is included in a manifest of the application, whether the application is a preload application or not, or whether the application is included in the white list.

The desktop mode policy manager 762 may receive the information obtained by the desktop mode service 761. Based on the received information, the desktop mode policy manager 762 may determine whether to generate a first type of window or a second type of window to display an execution screen of the application. The desktop mode policy manager 762 may convey the determination result to the desktop mode service 761, and the desktop mode service 761 may provide a service based on the received result.

The window manager 765 may modify the configuration 780. The window manager 765 may generate a window based on the modified configuration 780. For example, when the configuration 780 is modified, the window manager 765 may generate a configuration modification event and may generate a window based on the modified configuration 780. The window manager 765 may display icons for providing functions, such as back, minimize, maximize, and/or close, in a header at the top of the window. For example, when generating a resizable window (a popup window) that occupies a partial area of a screen, the window manager 765 may display icons for providing functions, such as back, minimize, maximize, and close, in a header at the top of the window. In another example, when generating a resizable window that occupies the entirety of a screen, the window manager 765 may display icons for providing functions, such as back, minimize, change to popup window, and close, in a header at the top of the window. In another example, when generating a non-rotatable window with a fixed size, the window manager 765 may display icons for providing functions, such as back, minimize, and close, in a header at the top of the window. In another example, when generating a rotatable window with a fixed size, the window manager 765 may display icons for providing functions, such as back, rotate, minimize, and close, in a header at the top of the window.

After the configuration 780 is modified, the activity manager 766 may obtain the modified configuration 780 from the window manager 765. The activity manager 766 may allow a resource manager to refine the resources 770, based on the modified configuration 780. The activity manager 766 may allow the application or activities included in the application to configure a screen based on the modified configuration 780.

The multi-window manager 767 may provide, for example, a window-related function not being supported by the window manager 765. For example, the multi-window manager 767 may generate a second type of window. In another example, the multi-window manager 767 may provide a function of minimizing a window. In another example, the multi-window manager 767 may generate an additional window including icons for providing functions, such as back, minimize, maximize, and/or close, and may dispose the additional window near the window in which the execution screen of the application is displayed.

The resources 770 may be resources of the activities included in the application. Activity resources 771 may include, for example, information about an image and a layout included in an execution screen of an activity modified based on the configuration 780.

The configuration 780 may include information about the density (dpi), orientation (landscape or portrait), and total size of a screen generated by the electronic device 400 and the size of the execution screen of the application. The configuration 780 may correspond to the activities included in the application.

The display info 790 may include information about a physical size (e.g., width and height) of a display.

Figure 8:
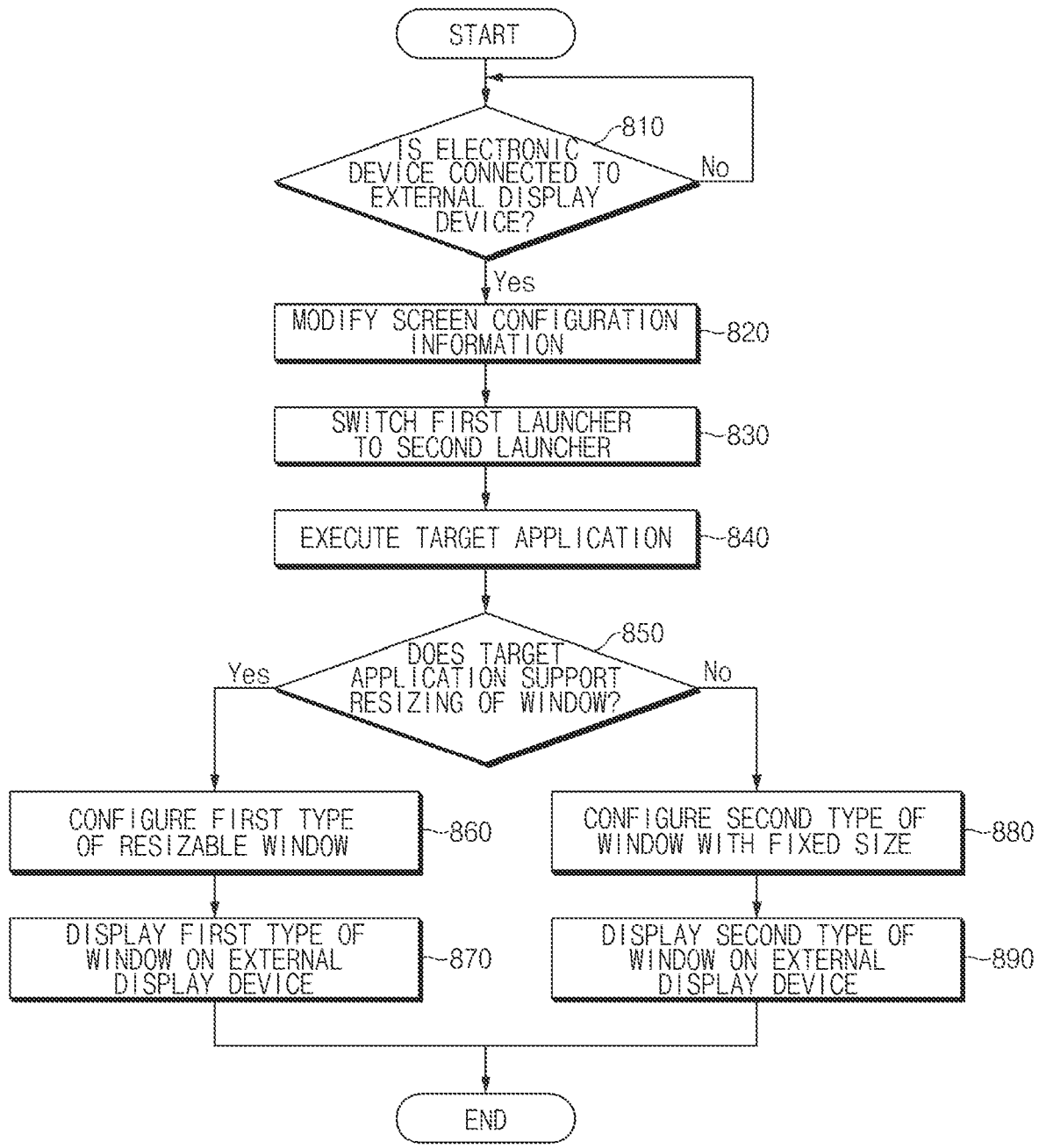
FIG. 8 illustrates operations of a window management method of an electronic device according to certain embodiments.

FIG. 8 illustrates operations of a window management method of an electronic device according to various embodiments.

Hereinafter, it is assumed that, according to some embodiments, the electronic device 400 of FIG. 6 performs the process illustrated in FIG. 8. Furthermore, it may be understood that, in some embodiments, operations set forth as being performed by the electronic device in the description of FIG. 8 are controlled by the processor 450 of the electronic device 400.

Referring to the non-limiting example of FIG. 8, in operation 810, the electronic device may determine whether the electronic device is connected to an external display device. For example, the electronic device may determine whether the electronic device is connected to the external display device through an intermediary device or a cable. In another example, the electronic device may determine whether the electronic device is wirelessly connected to the external display device.

When it is determined that the electronic device is connected to the external display device, the electronic device may, in operation 820, modify screen configuration information. For example, the electronic device may modify information about the resolution, density, or orientation of a screen generated by the electronic device as appropriate for the external display device. The electronic device may set the resolution, density, or orientation of the screen generated by the electronic device to a specified value.

In operation 830, the electronic device may switch a first launcher to a second launcher. For example, the electronic device, before connected to the external display device, may execute the first launcher that provides a UI and UX for a touch screen display of the electronic device. The electronic device, when connected to the external display device, may execute the second launcher that provides a UI and UX for the external display device.

In operation 840, the electronic device may execute a target application. For example, the electronic device may execute the target application by selecting an application on a screen provided by the second launcher. In another example, the electronic device may maintain execution of an application executed before the electronic device is connected to the external display device.

In operation 850, the electronic device may determine whether the target application supports resizing of a window. For example, the electronic device may determine whether the target application supports resizing of a window, based on whether support of resizing is declared in a manifest of the target application, whether the target application is a preload application or not, and/or whether the target application is included in a white list.

When it is determined that the target application supports resizing of a window, the electronic device may, in operation 860, configure a first type of resizable window. For example, the electronic device may generate the first type of window, which displays an execution screen of the target application, on a screen generated based on the modified screen configuration information. The first type of window may be generated to be resizable.

In operation 870, the electronic device may display the first type of window on the external display device. For example, the electronic device may display the execution screen of the target application in the first type of window. The electronic device may resize the first type of window.

When it is determined that the target application does not support resizing of a window, the electronic device may, in operation 880, configure a second type of window with a fixed size. For example, the electronic device may generate the second type of window, which displays the execution screen of the target application, on the screen generated based on the modified screen configuration information. The second type of window may be generated so as not to allow resizing.

In operation 890, the electronic device may display the second type of window on the external display device. For example, the electronic device may display the execution screen of the target application in the second type of window. The electronic device may not allow resizing of the second type of window.

Figure 9:
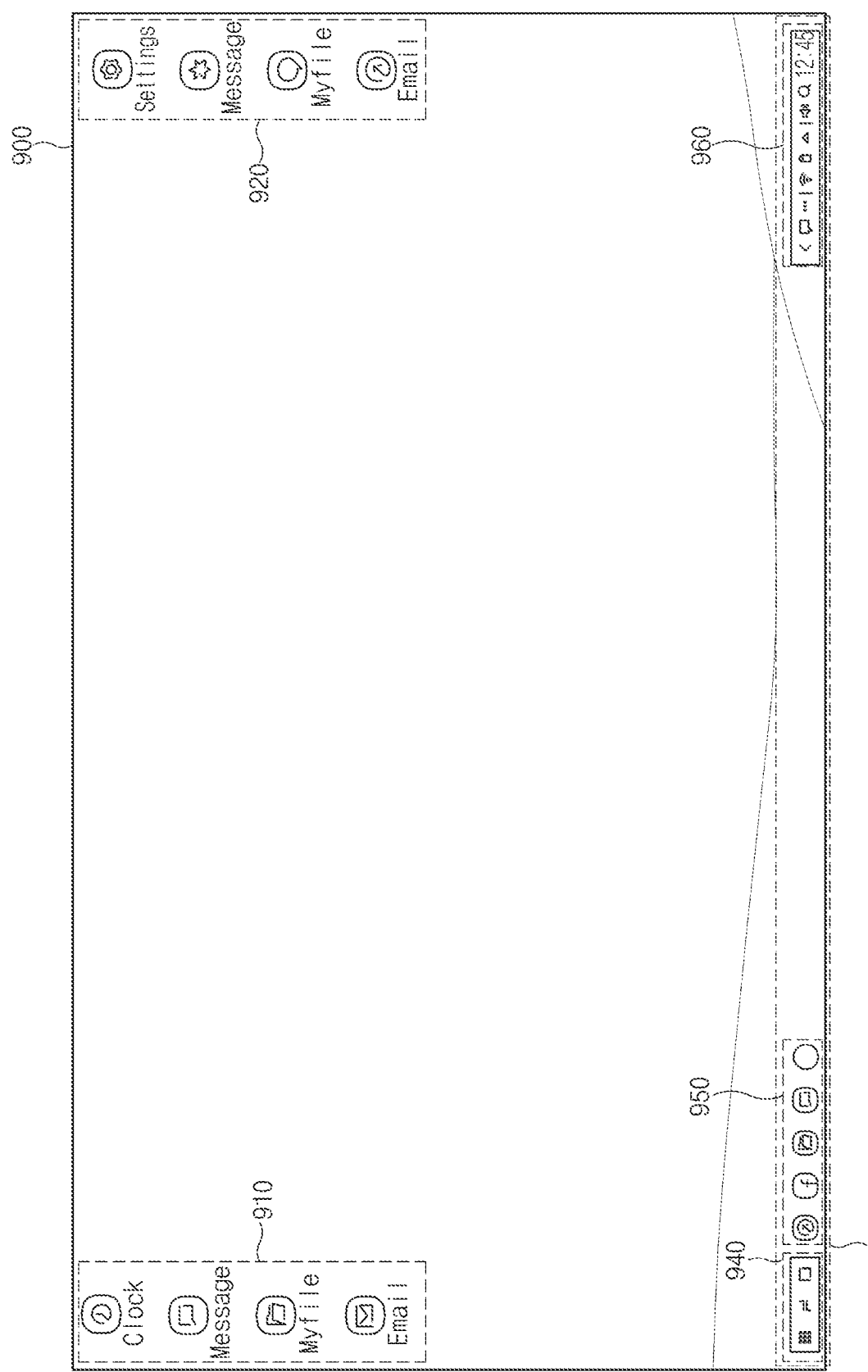
FIG. 9 illustrates a screen output by an electronic device according to some embodiment.
Figure 10:
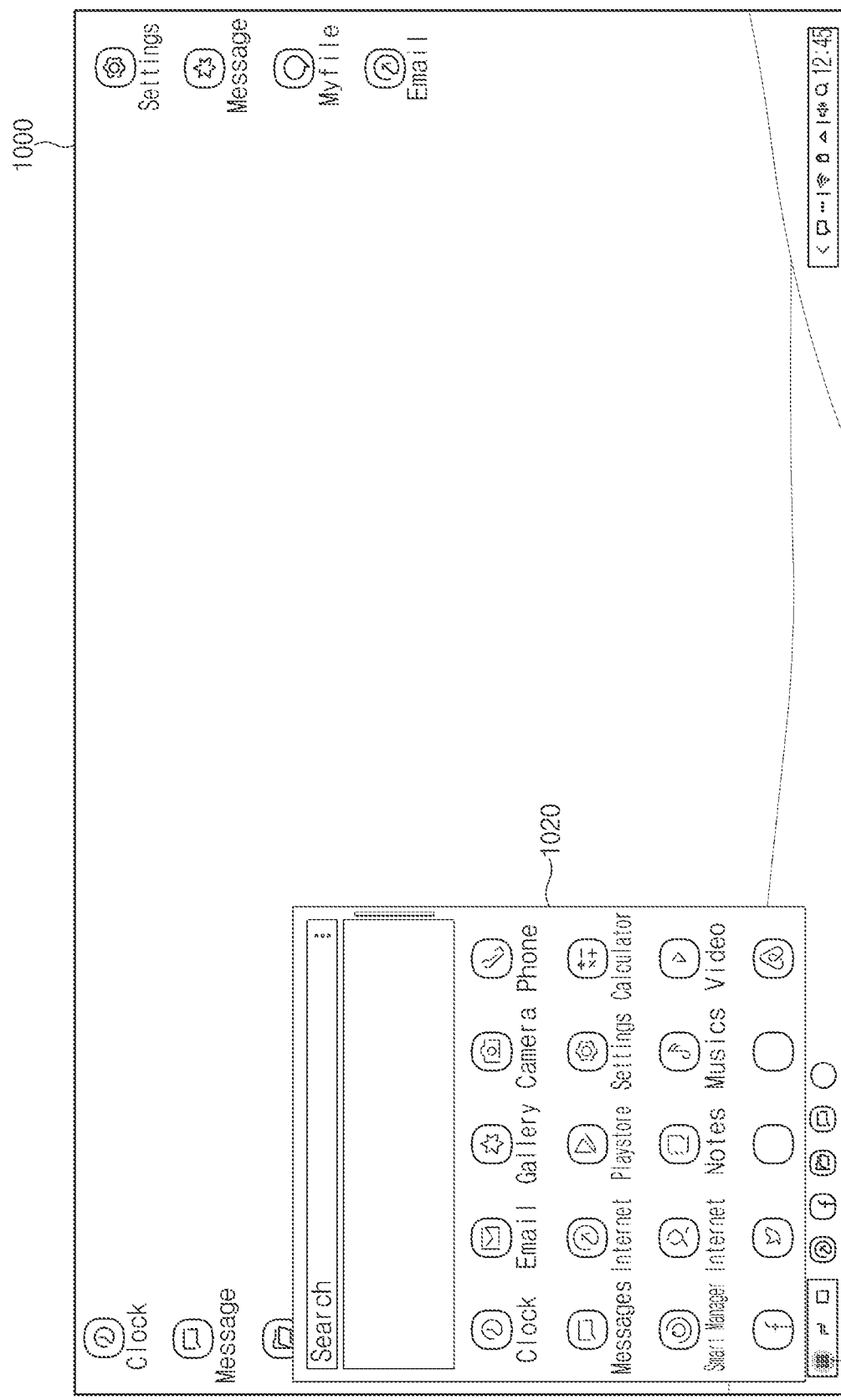
FIG. 10 illustrates a screen provided by an electronic device according to various embodiments.
Figure 11:
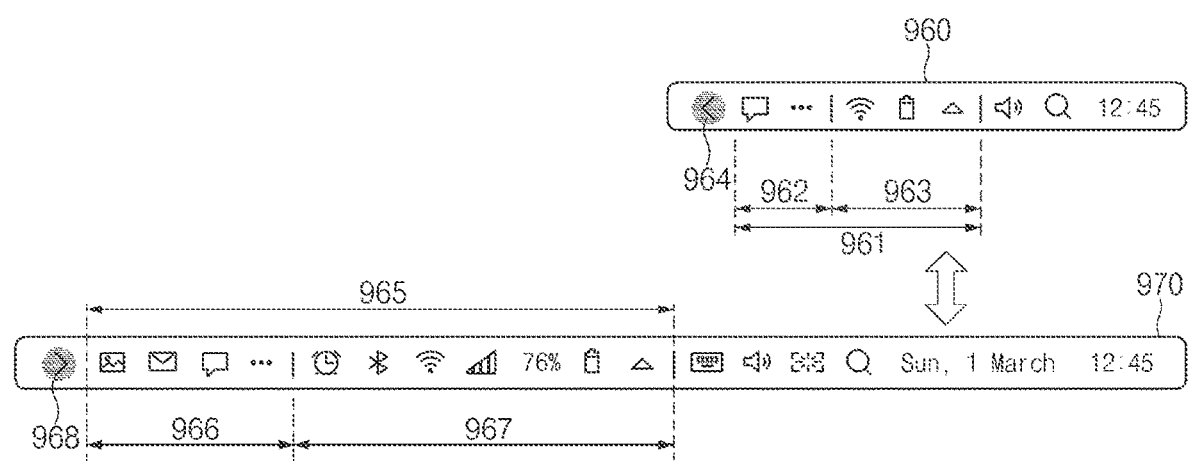
FIG. 11 illustrates a screen provided by an electronic device according to some embodiments.

FIG. 9 illustrates s screen output by an electronic device according to certain embodiments of this disclosure. FIG. 10 illustrates a screen provided by an electronic device according to various embodiments of this disclosure. FIG. 11 illustrates a portion of a screen provided by an electronic device according to some embodiments.

Referring to the non-limiting example of FIG. 9, an electronic device according to an embodiment, when connected to an external display device, may output a home screen 900 through the external display device. The home screen 900 may be provided by the desktop mode launcher 750. The home screen 900 may be configured in a form suitable to output through the external display device.

The home screen 900 may include, in a first area 910 and a second area 920 thereof, shortcuts for applications. The home screen 900 may also include one or more shortcuts and/or one or more folders including files. The home screen 900 may also provide functions, such as selection, shift, and/or reordering.

The home screen 900 may include a task bar 930. The task bar 930 may include one or more function keys 940. When an input is applied to the function keys 940, the electronic device may execute functions corresponding to the function keys 940. The task bar 930 may include one or more shortcuts 950 for quick launch. The task bar 930 may include a panel 960 for displaying notifications, system states, or the like.

The task bar 930 may be disposed on a lower side of the home screen 900. The task bar 930 may also be disposed on a left, right, or upper side of the home screen 900. The task bar 930 may be hidden depending on executed applications or settings. The hidden task bar 930 may be displayed again when a mouse cursor moves to a specified area.

Referring to the non-limiting example of FIG. 10, an electronic device according to some embodiments, when connected to an external display device, may output a home screen 1000 through the external display device. The electronic device may display an app tray 1020 when an input is applied to a function key 1010 of the home screen 1000. The app tray 1020 may include shortcuts for all applications installed in the electronic device and a search window for searching for an application. When a search term is entered into the search window of the app tray 1020, the electronic device may search for an application matching the search term. When an input is applied to a shortcut displayed on the app tray 1020, an application corresponding to the shortcut may be executed. When a shortcut displayed on the app tray 1020 is dragged outside the app tray 1020, a shortcut may be generated on the home screen 1000.

Referring to the non-limiting example of FIG. 11, the panel 960 included in the home screen 900 may include a quick panel area 961. The quick panel area 961 may include a notification area 962 for displaying notifications occurred in the electronic device and a system state area 963 for representing system states. The notification area 962 may display arrival of messages, photographing, missed calls, application-related notifications, or the like. The system state area 963 may display a notification set state, a Bluetooth connection state, a Wi-Fi connection state, a cellular network connection state, a battery level, or the like. The notification area 962 and the system state area 963 may be collapsed. The reduced notification area 962 and the reduced system state area 963 may display some of the notifications and some of the system states, respectively. When an input is applied to an expansion button 964 included in the panel 960, the notification area 962 and the system state area 963 may be expanded.

When the input is applied to the expansion button 964, an expanded notification area 966 and an expanded system state area 967 may be displayed. The expanded notification area 966 may display more notifications than the reduced notification area 962. The expanded system state area 967 may display more system states than the reduced system state area 963. When an input is applied to a reduction button 968 included in an expanded panel 970, the expanded notification area 966 and the expanded system state area 967 may be collapsed again.

Figure 12:
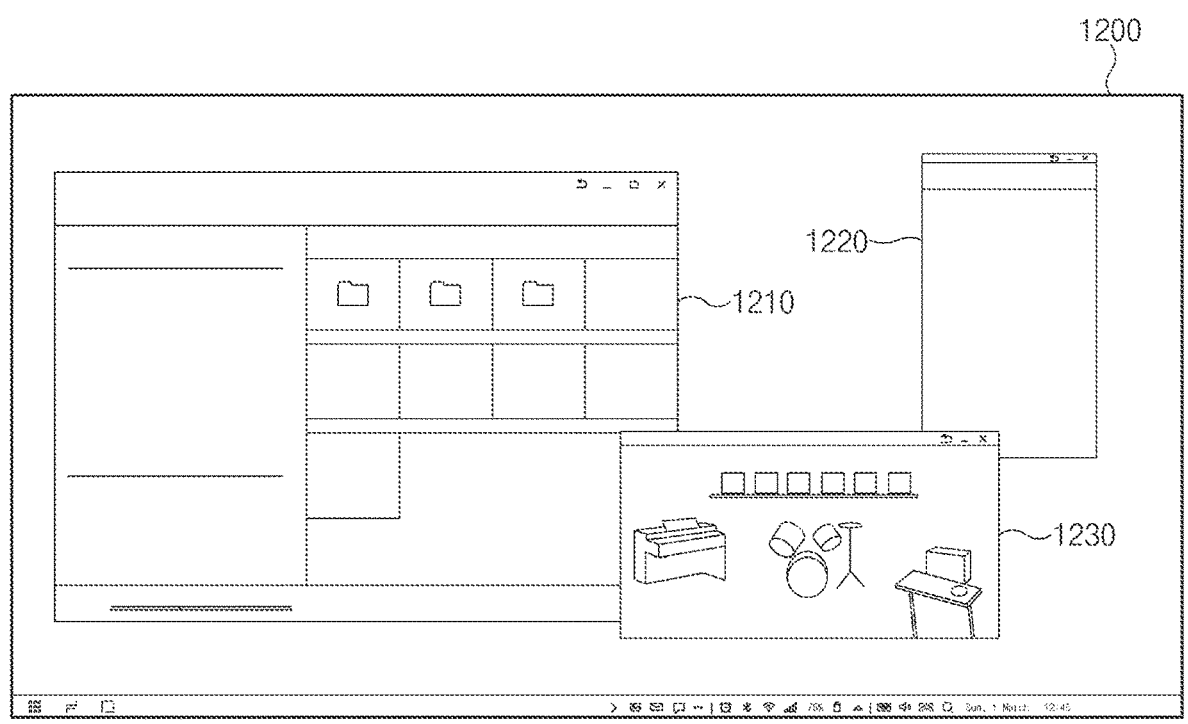
FIG. 12 illustrates a screen provided by an electronic device according to certain embodiments.

FIG. 12 illustrates a screen provided by an electronic device according to certain embodiments of this disclosure.

Referring to the non-limiting example of FIG. 12, an electronic device according to some embodiments, when connected to an external display device, may output a home screen 1200 through the external display device. The home screen 1200 may include, for example, a first window 1210, a second window 1220, and a third window 1230. The first window 1210, the second window 1220, and the third window 1230 may include an execution screen of a first application, an execution screen of a second application, and an execution screen of a third application, respectively.

The first application may be, for example, an application that supports resizing of a window. The first window 1210 may include the execution screen of the first application and may be resized. When the first window 1210 is resized, the electronic device may modify a configuration of the execution screen of the first application, based on the size of the first window 1210. The electronic device may modify, for example, the size and arrangement of images, text, and/or icons included in the execution screen of the first application. In another example, the electronic device, when connected to the external display device, may change an execution mode of the first application. The electronic device, when receiving a request to execute the first application, may identify whether the electronic device is connected to the external display device. In the case where the electronic device is connected to the external display device, the electronic device may execute the first application in a first mode. In the case where the electronic device is disconnected from the external display device, the electronic device may execute the first application in a second mode. A UI of the first mode and a UI of the second mode may differ from each other. The electronic device may change the execution mode of the first application if there is a change in the connection state between the electronic device and the external display device.

The second application may be, for example, an application that does not support resizing of a window. The execution screen of the second application may have to be displayed in a portrait mode. The second window 1220 may include the execution screen of the second application. The second window 1220 may be generated at a ratio corresponding to the portrait mode. Resizing of the second window 1220 may not be allowed.

The third application may be, for example, an application that does not support resizing of a window. The execution screen of the third application may have to be displayed in a landscape mode. The third window 1230 may include the execution screen of the third application. The third window 1230 may be generated at a ratio corresponding to the landscape mode. Resizing of the third window 1230 may not be allowed.

According to some embodiments, when executing an application that does not support resizing of a window, the electronic device may decide whether to execute the application in a portrait or landscape mode. For example, the electronic device may display an execution screen of the application in a portrait or landscape mode specified to correspond to the application. In another example, the electronic device may display the execution screen of the application in the portrait or landscape mode in which the application was previously executed (in the orientation at the time of executing the application or in the orientation at the time of ending the application). Information about the mode in which the application was previously executed may be stored in a white list.

According to certain embodiments, an application may recognize that an execution screen of the application is displayed on the entire screen. For example, an application (e.g., the second application or the third application) that does not support resizing of a window may recognize that an execution screen of the application is displayed on the entire screen (e.g., the home screen 1200). For example, when the application is executed, the electronic device may convey, to the application, information about the size of a window (e.g., the second window 1220 or the third window 1230) in which the application is displayed. The application may recognize the received information about the size of the window as information about the size of the entire screen. In other words, the electronic device may fake out the application as if the execution screen of the application is displayed on the entire screen. The application may render the execution screen of the application, recognizing that the execution screen of the application is displayed on the entire screen. Since the electronic device provides the information about the size of the window to the application, the execution screen of the application may be rendered to fit the size of the window. The rendered screen may be output through the window.

Figure 13:
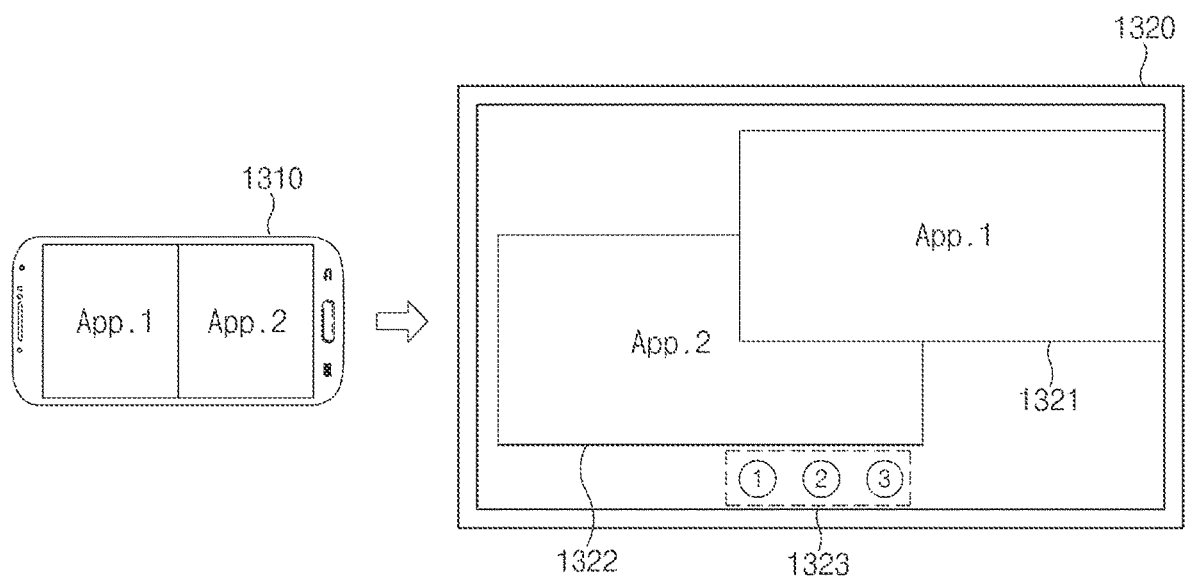
FIG. 13 illustrates a screen provided by an electronic device according to some embodiments.

FIG. 13 illustrates a screen provided by an electronic device according to some embodiments.

Referring to the non-limiting example of FIG. 13, an electronic device 1310 according to some embodiments may execute a first application in the foreground. The electronic device 1310 may display an execution screen of the first application in a partial area of a touch screen display of the electronic device 1310. The electronic device 1310 may execute a second application in the foreground. The electronic device 1310 may display an execution screen of the second application in a partial area of the touch screen display of the electronic device 1310. The first application and the second application may be displayed in a multi-window, and the first application may be focused. The electronic device 1310 may execute a third application in the background.

According to various embodiments, the electronic device 1310, when connected to an external display device 1320, may output a screen through the external display device 1320. While the screen is being output through the external display device 1320, the electronic device 1310 may not output a screen on the touch screen display thereof. The electronic device 1310 may end an application being executed when the electronic device 1310 is connected to the external display device 1320 and thereafter may execute the application again, or the electronic device 1310 may display an execution screen of the application without ending the application. The electronic device 1310 may display, in a first window 1321, the execution screen of the first application being executed in the foreground when the electronic device 1310 is connected to the external display device 1320 and may display, in a second window 1322, the execution screen of the second application being executed in the foreground. The electronic device 1310 may display, above the second window 1322, the first window 1321 that displays the execution screen of the first application focused when the electronic device 1310 is connected to the external display device 1320. The electronic device 1310 may not display an execution screen of the third application executed in the background. The electronic device 1310 may display icons 1323 corresponding to all the applications, that is, the first to third applications, respectively, which are being executed when the electronic device 1310 is connected to the external display device 1320. The electronic device 1310 may display the execution screen of the third application when the icon corresponding to the third application, among the icons 1323, is selected.

Figure 14:
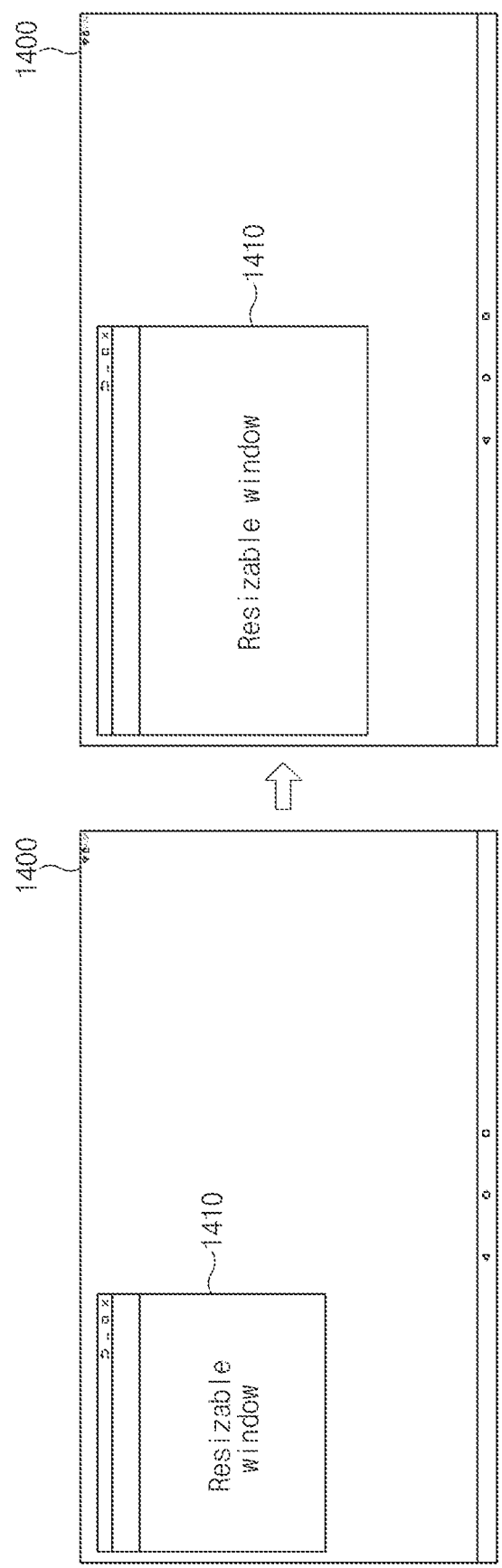
FIG. 14 illustrates a resizable window included in a screen provided by an electronic device according to some embodiments.

FIG. 14 illustrates a resizable window included in a screen provided by an electronic device according to various embodiments.

Referring to the non-limiting example of FIG. 14, an electronic device according to various embodiments may display a home screen 1400. The home screen 1400 may include a window 1410 that displays an execution screen of an application. The application may be an application that supports resizing. The window 1410 may be a first type of window. The window 1410 may include, in a header at the top thereof, buttons for executing functions, such as back, change to default size, maximize, close, and the like. The window 1410 may be resized depending on a user input. When an input for resizing the window 1410 is applied, the electronic device may display a blue boundary line on the periphery of the window 1410. A maximum size and a minimum size of the window 1410 may be limited. When an input for increasing the size of the window 1410 is applied after the window 1410 is expanded to the maximum size, or when an input for reducing the size of the window 1410 is applied after the window 1410 is reduced to the minimum size, the electronic device may display a red boundary line on the periphery of the window 1410 to inform a user that the window 1410 cannot be resized. After the window 1410 is resized, contents, such as images, text, and the like, which are included in the execution screen of the application may be rearranged to fit the size of the window 1410. For example, as illustrated in FIG. 14, text arranged in two rows in the window 1410 may be rearranged in a row when the window 1410 increases in size.

Figure 15:
FIG. 15 illustrates a fixed window included in a screen provided by an electronic device according to some embodiments.

FIG. 15 illustrates a fixed window included in a screen provided by an electronic device according to some embodiments of this disclosure.

Referring to the non-limiting example of FIG. 15, an electronic device according to some embodiments of this disclosure may generate a first window 1510 that includes an execution screen of an application. The application may be an application that does not support resizing. The first window 1510 may be a second type of window. Resizing of the first window 1510 may not be allowed. When an input for resizing the first window 1510 is applied, the electronic device may display a red boundary line on the periphery of the first window 1510 to inform a user that the first window 1510 cannot be resized.

According to various embodiments, the electronic device may configure an additional window that displays information about the second type of window or a UI for control of the second type of window, and may display the additional window on an external display device such that the additional window is adjacent to the second type of window. For example, the electronic device may generate a second window 1520. The electronic device may dispose the second window 1520 near the top of the first window 1510. The second window 1520 may include buttons for performing functions, such as turn, back, minimize, close, and the like, on the first window 1510. The turn button may be included in the second window 1520 only in the case where the application displayed in the first window 1510 supports change of orientation (a portrait mode and a landscape mode). The turn button may not be included in the second window 1520 if the application displayed in the first window 1510 does not support change of orientation. The second window 1520 may display information, such as name, of the application displayed in the first window 1510.

Figure 16:
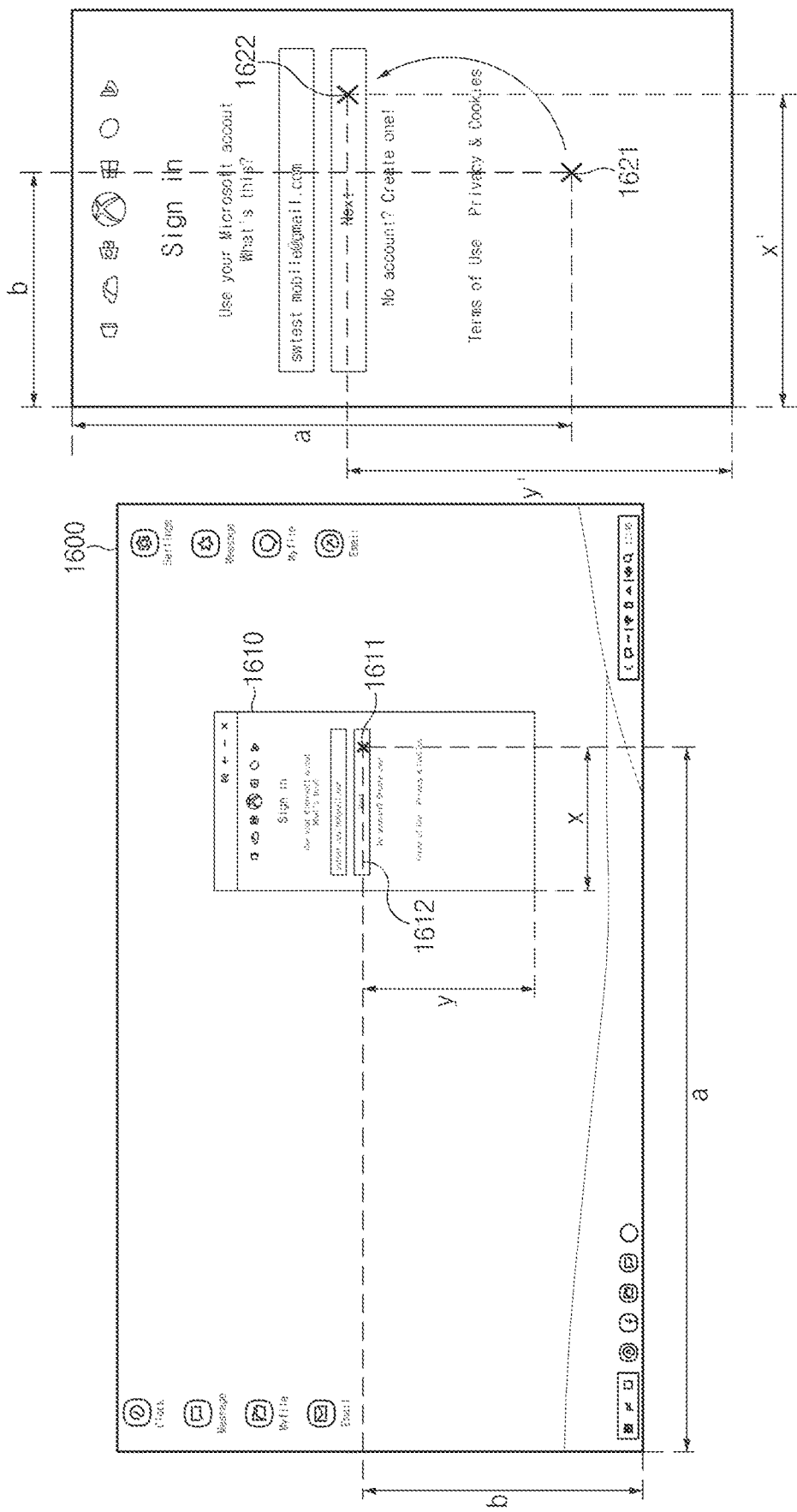
FIG. 16 illustrates a schematic view of a transformation of coordinates by an electronic device according to certain embodiments.

FIG. 16 illustrates aspects of a transformation of coordinates by an electronic device according to various embodiments of this disclosure.

According to some embodiments, when an input is applied to a point in a second type of window, an electronic device may recognize coordinates where the input is applied, may transform the recognized coordinates, based on modified screen configuration information and the position of the second type of window, and may execute an operation of a target application that corresponds to the input to the transformed coordinates.

Referring to the non-limiting example of FIG. 16, the electronic device according to an embodiment, when connected to an external display device, may output a home screen 1600 through the external display device. The home screen 1600 may include a window 1610 that includes an execution screen of an application. The window 1610 may be the second type of window, and the application may be an application that does not support resizing of the window 1610. The electronic device may receive a user input to a first point 1611 that is intended for an input to a button 1612 in the window 1610. The electronic device may convey, to the application displayed in the window 1610, coordinates (e.g., (a, b)) of the user input to the first point 1611.

The application displayed in the second type of window may recognize that the application is displayed on the entire screen. Based on the received coordinates, the application may determine that the user input is input to a second point 1621. The electronic device may transform the coordinates, based on information about the resolution, density, and orientation of the home screen 1600 and information about the position of the window 1610. For example, the electronic device may transform the coordinates (a, b) into coordinates (x', y'). The electronic device may convey the transformed coordinates to the application displayed in the window 1610, and the application may recognize an input to a third point 1622 and may execute an operation corresponding to the input to the third point 1622.

Figure 17:
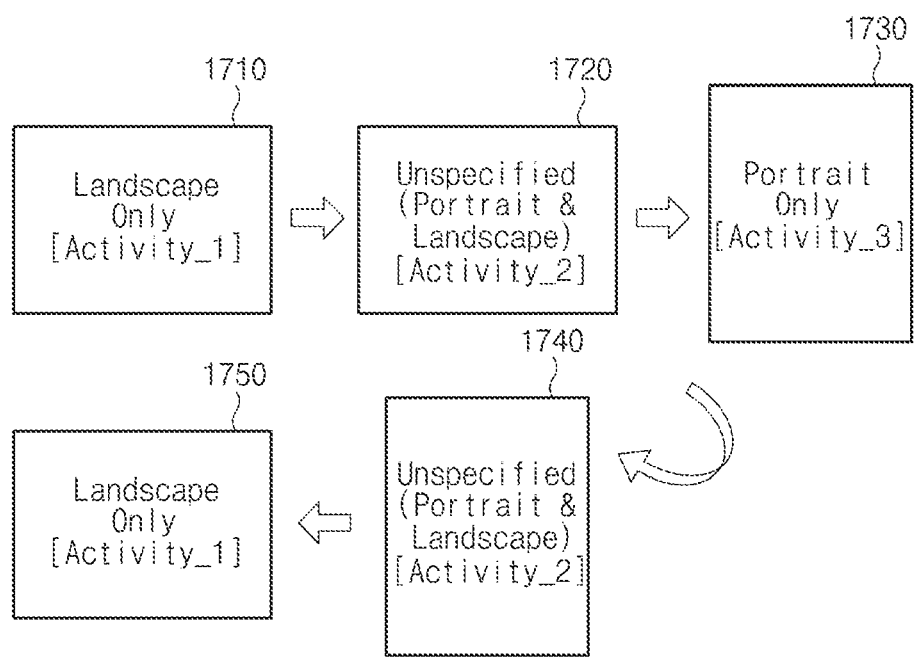
FIG. 17 illustrates a schematic view showing aspects of a determination of screen orientation by an electronic device according to some embodiments.

FIG. 17 illustrates aspects of a determination of screen orientation by an electronic device according to some embodiments of this disclosure.

According to certain embodiments, a target application may include a plurality of executable activities, and when one activity of the plurality of activities is executed, an electronic device may display an execution screen of the one activity in the same orientation as the orientation in which an execution screen of an activity executed prior to the one activity is displayed.

Referring to the non-limiting example of FIG. 17, the electronic device may execute an application and then execute a plurality of activities included in the application. The electronic device may execute a first activity. The electronic device may display an execution screen of the first activity in a first window 1710. The first activity may be displayed in only a landscape mode. The first window 1710 may be generated in the horizontal orientation to display the first activity.

The electronic device may execute a second activity after the first activity is executed. The second activity may be displayed in a portrait or landscape mode. The electronic device may display an execution screen of the second activity in a second window 1720. Since the second activity supports both the landscape mode and the portrait mode, the electronic device may generate the second window 1720 in the same orientation as that of the first window 1710 in which the execution screen of the first activity executed prior to the second activity is displayed. The second window 1720 may be generated in the horizontal orientation to display the second activity.

The electronic device may execute a third activity after the second activity is executed. The electronic device may display an execution screen of the third activity in a third window 1730. The third activity may be displayed in only a portrait mode. The third window 1730 may be generated in the vertical orientation to display the third activity, irrespective of the second window 1720.

The electronic device may execute the second activity again after the third activity is executed. The electronic device may display an execution screen of the second activity in a fourth window 1740. Since the second activity supports both the landscape mode and the portrait mode, the electronic device may generate the fourth window 1740 in the same orientation as that of the third window 1730 in which the execution screen of the third activity executed prior to the second activity is displayed. The fourth window 1740 may be generated in the vertical orientation to display the second activity.

The electronic device may execute the first activity again after the third activity is executed. The electronic device may display an execution screen of the first activity in a fifth window 1750. Since the first activity is displayed in only the landscape mode, the fifth window 1750 may be generated in the horizontal orientation to display the first activity, irrespective of the fourth window 1740.

For the convenience of description, the activities are illustrated in the non-limiting example of FIG. 17 as being displayed in the first to fifth windows 1710 to 1750. However, the first to fifth windows 1710 to 1750 may, according to some embodiments, be the same window. For example, the second window 1720 may be the same window as the first window 1710, the third window 1730 may be transformed from the second window 1720, the fourth window 1740 may be the same window as the third window 1730, and the fifth window 1750 may be transformed from the fourth window 1740.

According to at least one embodiment, where the electronic device executes an activity that supports both a landscape mode and a portrait mode, the electronic device may display an execution screen of the activity in a specified mode of the landscape and portrait modes if a history of an activity executed prior to the activity does not exist.

Figure 18:
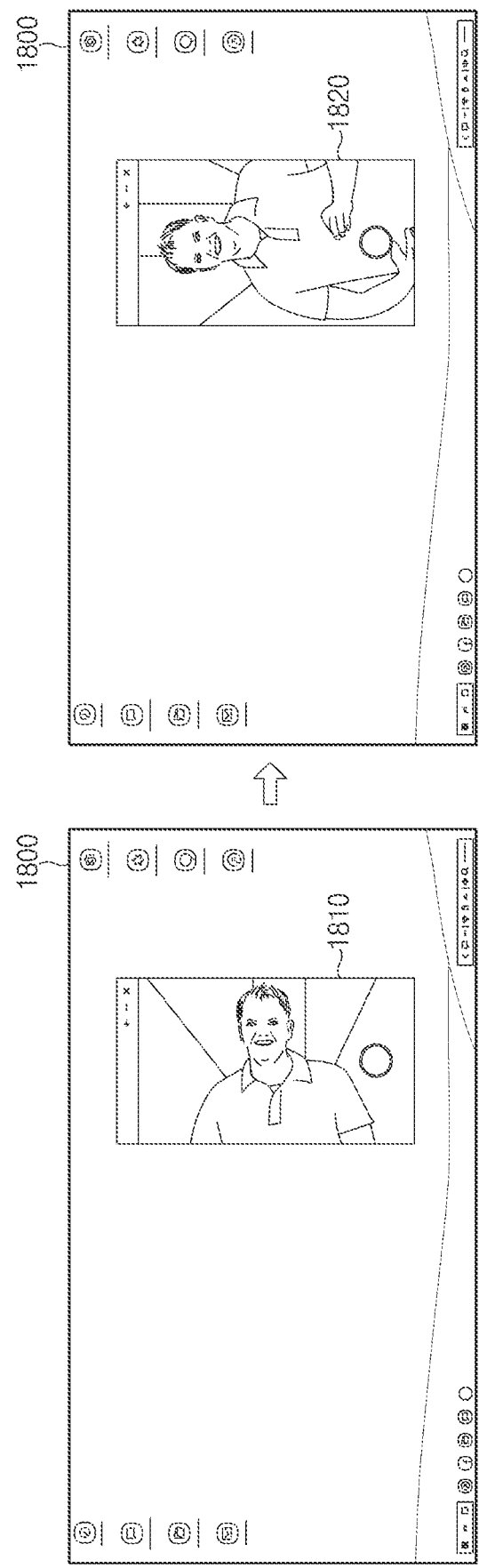
FIG. 18 illustrates a schematic view showing aspects of a change of image orientation by an electronic device according to some embodiments.

FIG. 18 illustrates aspects of a change of image orientation by an electronic device according to some embodiments of this disclosure.

Referring to the non-limiting example of FIG. 18, an electronic device according to certain embodiments, when connected to an external display device, may output a home screen 1800 through the external display device. The home screen 1800 may include a window 1810. The window 1810 may include an execution screen of a camera application. The window 1810 may display, for example, a preview image taken by a camera of the electronic device.

The electronic device, when connected to the external display device with the horizontal sides longer than the vertical sides, may generate the home screen 1800 in the horizontal orientation. In this case, although the electronic device actually takes an image in the state in which the electronic device is placed in the vertical orientation, the electronic device may recognize that the electronic device is placed in the horizontal orientation. The camera application may recognize that the electronic device is placed in the horizontal orientation, and may display a horizontal preview image in the window 1810, as illustrated on a left side of FIG. 18.

To prevent the preview image from being displayed in an orientation different from the actual orientation of the electronic device, the electronic device may, in some embodiments, change the orientation of the preview image in the case where the camera application is executed in the state in which the electronic device is placed in the vertical orientation. For example, as illustrated on a right side of FIG. 18, the electronic device may rotate the preview image by 90 degrees in the counterclockwise direction and may display the rotated image in the window 1810.

An electronic device according to at least one embodiment of this disclosure may include a touch screen display, an input/output interface connected to an external display device, a communication circuit in communication with a server, a memory, and a processor electrically connected to the touch screen display, the input/output interface, the communication circuit, and the memory. The processor may modify screen configuration information associated with at least a part of a resolution, a density, and an orientation of a screen output by the electronic device if the electronic device is connected to the external display device through the input/output interface, may determine whether a target application to be displayed on the external display device supports resizing of a window that displays an execution screen of the target application, may configure a first type of window which is resizable, based on the modified screen configuration information and the execution screen of the target application if the target application supports the resizing, may configure a second type of window with a fixed size, based on the modified screen configuration information and the execution screen of the target application if the target application does not support the resizing, and may display the first type of window or the second type of window on the external display device.

According to at least one embodiment of this disclosure, the processor may modify the screen configuration information if the electronic device is connected to an intermediary device that is connectable to the external display device through the input/output interface.

According to some embodiments, the processor may modify the screen configuration information if the electronic device is connected to the external display device through a cable connected to the input/output interface.

According to certain embodiments, the processor may modify the screen configuration information to a specified value if the electronic device is connected to the external display device through the input/output interface.

According to various embodiments, the processor may modify the screen configuration information, based on information about the external display device if the electronic device is connected to the external display device through the input/output interface.

According to at least one embodiment, the memory may store a first launcher for the touch screen display and a second launcher for the external display device, and the processor may execute the first launcher if the electronic device is disconnected from the external display device and may execute the second launcher if the electronic device is connected to the external display device through the input/output interface.

According to some embodiments of this disclosure, the processor may determine whether an application being executed in the electronic device when the electronic device is connected to the external display device or an application executed after the electronic device is connected to the external display device supports the resizing.

According to certain embodiments of this disclosure, the processor may determine whether the target application supports the resizing, based on information included in a manifest of the target application.

According to various embodiments, the processor may determine whether the target application supports the resizing, based on whether the target application is a preload application or not.

According to at least one embodiment, the processor may determine whether the target application supports the resizing, based on a list received from the server.

According to some embodiments, the processor may configure the second type of window having the same size as the touch screen display.

According to some embodiments, the processor may recognize coordinates of an input applied to a point in the second type of window, may transform the recognized coordinates, based on the modified screen configuration information and a position of the second type of window, and may execute an operation of the target application that corresponds to the input to the transformed coordinates.

According to at least one embodiment, the processor may configure an additional window that displays information about the second type of window or a user interface (UI) for control of the second type of window and may display the additional window near the second type of window on the external display device.

According to certain embodiments, the target application may include a plurality of executable activities, and if one activity of the plurality of activities is executed, the processor may display an execution screen of the one activity in the same orientation as an orientation in which an execution screen of an activity executed prior to the activity is displayed.

A window management method of an electronic device, according to various embodiments of this disclosure, may include modifying screen configuration information associated with at least a part of a resolution, a density, and an orientation of a screen displayed on the electronic device if the electronic device is connected to an external display device, determining whether a target application to be displayed on the external display device supports resizing of a window that displays an execution screen of the target application, configuring a first type of window which is resizable, based on the modified screen configuration information and the execution screen of the target application if the target application supports the resizing, configuring a second type of window with a fixed size, based on the modified screen configuration information and the execution screen of the target application if the target application does not support the resizing, and displaying the first type of window or the second type of window on the external display device.

An electronic device according to some embodiments may include a housing including a first surface and a second surface facing away from the first surface, a touch screen display exposed through a portion of the first surface, at least one communication circuit positioned inside the housing, at least one processor positioned inside the housing and electrically connected to the touch screen display and the at least one communication circuit, and a memory positioned inside the housing and electrically connected to the at least one processor. The memory may store a first application program including a first type of user interface that provides at least one piece of information about whether a window can be resized, which orientation the window can have, and/or a resolution on the touch screen display and a second application program including a second type of user interface that provides at least one piece of information about whether the window can be resized, which orientation the window can have, and/or the resolution on the touch screen display. The memory may store instructions that, when executed, cause the at least one processor to detect that the electronic device is in communication with an external display device via the at least one communication circuit, to provide data to the external display device via the at least one communication circuit for rendering a user interface on the external display device, upon detecting that the electronic device is in communication with the external display device, to cause the external display device to display a first window that is variable in size, orientation, and/or resolution if the data is associated with the first application program, and to cause the external display device to display a second window with a selected fixed size, orientation, and/or resolution if the data is associated with the second application program.

According to at least one embodiment, the selected fixed size may be substantially the same as a size of the touch screen display.

According to various embodiments, the instructions may cause the at least one processor to determine whether an application program includes the first type of user interface or the second type of user interface, based at least partly on information obtained from an external server via the at least one communication circuit.

According to some embodiments, the first window may include a first set of buttons to modify the first window, the second window may include a second set of buttons to modify the second window, and the second set of buttons may be different from the first set of buttons.

According to certain embodiments, the first application program may allow resizing of the window, and the second application program may not allow the resizing of the window.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A portable communication device comprising:
a touchscreen display;
a communication circuit configured to accommodate a cable to establish a communication connection with an external display device;
memory to store a plurality of applications including:
a first application capable of resizing of a first window on the external display device corresponding to the first application, and
a second application incapable of resizing of a second window on the external display device corresponding to the second application; and
a processor operatively coupled with the touchscreen display, memory, and the communication circuit;
wherein the memory stores instructions that, when executed, cause the processor to:
based at least in part on a determination that the communication connection is established between the portable communication device and the external display device using the communication circuit and the cable, generate a graphical user interface (GUI) including a first icon corresponding to the first application that is capable of resizing and a second icon corresponding to the second application that is incapable of resizing;

cause the GUI to be displayed via the external display device using the communication circuit and the cable;

in response to a first input with respect to the first icon displayed via the external display device, modify the GUI to include a resizable window corresponding to the first application and including a first header region, and cause the modified GUI including the resizable window to be displayed via the external display device using the communication circuit and the cable such that the resizable window is displayed in the modified GUI; and in response to a second input with respect to the second icon displayed via the external display device, modify the GUI to include a non-resizable window corresponding to the second application and including a second header region, and cause the modified GUI including the non-resizable window to be displayed via the external display device using the communication circuit and the cable such that the non-resizable window is displayed in the modified GUI, wherein each of the first header region and the second header region include a plurality of function buttons, the first header region includes a resize button to adjust a size of the resizable window, and the second header region does not include a resize button to adjust a size of the non-resizable window.

2. The portable communication device of claim 1, wherein:

the second input is received while the resizable window is displayed in the modified GUI via the external display device, and the instructions cause the processor to:
perform the modifying of the GUI to include the non-resizable window such that the non-resizable window is displayed concurrently with the resizable window in the modified GUI via the external display device.

3. The portable communication device of claim 2, wherein the instructions cause the processor to:

perform the modifying of the GUI to include the non-resizable window such that the resize button to adjust the size of the non-resizable window is not displayed in the modified GUI via the external display device.

4. The portable communication device of claim 3, wherein the instructions cause the processor to:

perform the generating of the GUI such that a first area of the GUI includes a first set of icons including the first icon and the second icon, and a second area of the GUI includes a second set of icons corresponding to one or more applications; and perform the modifying of the GUI to include the non-resizable window such that the non-resizable window is displayed in the first area, and not in the second area, of the modified GUI via the external display device.

5. The portable communication device of claim 4, wherein the first area is an area in which one or more windows are displayed as an outcome of execution of a corresponding application of a plurality of applications including the first application and the second application, and the second area is an area in which a window is not displayed when the corresponding application is executed.

6. The portable communication device of claim 1, wherein the instructions cause the processor to:

display, via the touchscreen display, another GUI different from the GUI while the GUI or the modified GUI is displayed via the external display device.

7. The portable communication device of claim 1, wherein the instructions cause the processor to:

perform the modifying of the GUI based at least in part on a determination that the first application or the second application is capable of resizing of a corresponding one of the first window and the second window.

8. The portable communication device of claim 1, wherein the instructions cause the processor to:

receive a third input with respect to the resize button; and
in response to the third input, display the modified GUI as the size of the resizable window is adjusted, via the external display device using the communication circuit such that the resizable window has the adjusted size in the modified GUI displayed via the external display device.

9. A portable communication device comprising:

a touchscreen display;

a communication circuit configured to establish a communication connection with an external display device;

memory to store a plurality of applications including:
a first application capable of resizing of a first window on the external display device corresponding to the first application, and
a second application incapable of resizing of a second window on the external display device corresponding to the second application; and a processor operatively coupled with the touchscreen display, the memory, and the communication circuit;

wherein the memory stores instructions that, when executed, cause the processor to:
based at least in part on a determination that the communication connection is established between the portable communication device and the external display device via the communication circuit, generate a graphical user interface (GUI) including a first icon corresponding to the first application and a second icon corresponding to the second application;
cause the GUI to to be displayed via the external display device using the communication circuit;
in response to a first input with respect to the first icon displayed via the external display device, modify the GUI to include a resizable window corresponding to the first application and including a first header region, and cause the modified GUI including the resizable window to be displayed via the external display device using the communication circuit such that the resizable window is displayed in the modified GUI via the external display device; and
in response to a second input with respect to the second icon displayed via the external display device, modify the GUI to include a non-resizable window corresponding to the second application and including a second header region, and cause the modified GUI including the non-resizable window to be displayed via the external display device using the communication circuit such that the non-resizable window is displayed in the modified GUI via the external display device, wherein each of the first header region and the second header region include a plurality of function buttons, the first header region includes a resize button to adjust a size of the resizable window, and the second header region does not include a resize button to adjust a size of the non-resizable window.

10. The portable communication device of claim 9, wherein:
the second input is received while the resizable window is displayed in the modified GUI via the external display device, and
the instructions cause the processor to:
perform the modifying of the GUI to include the non-resizable window such that the non-resizable window is displayed concurrently with the resizable window in the modified GUI via the external display device.

11. The portable communication device of claim 10, wherein the instructions cause the processor to:
perform the modifying of the GUI to include the non-resizable window such that the resize button to adjust the size of the non-resizable window is not displayed in the modified GUI via the external display device.

12. The portable communication device of claim 11, wherein the instructions cause the processor to:
perform the generating of the GUI such that a first area of the GUI includes a first set of icons including the first icon and the second icon, and a second area of the GUI includes a second set of icons corresponding to one or more applications; and
perform the modifying of the GUI to include the non-resizable window such that the non-resizable window is displayed in the first area, and not in the second area, of the modified GUI via the external display device.

13. The portable communication device of claim 12, wherein the first area is an area in which one or more windows are displayed as an outcome of execution of a corresponding application of a plurality of applications including the first application and the second application, and the second area is an area in which a window is not displayed when the corresponding application is executed.

14. The portable communication device of claim 9, wherein the instructions cause the processor to:
display, via the touchscreen display, another GUI different from the GUI while the GUI or the modified GUI is displayed via the external display device.

15. The portable communication device of claim 9, wherein the instructions cause the processor to:
perform the modifying of the GUI based at least in part on a determination that the first application or the second application is capable of resizing of a corresponding one of the first window and the second window.

16. The portable communication device of claim 9, wherein the instructions cause the processor to:
receive a third input with respect to the resize button; and
in response to the third input, transmit the modified GUI as the size of the resizable window is adjusted, to the external display device using the communication circuit such that the resizable window has the adjusted size in the modified GUI displayed via the external display device.

* * * * *